United States Patent
Paccione et al.

(10) Patent No.: US 11,951,454 B2
(45) Date of Patent: Apr. 9, 2024

(54) FLUID TREATMENT APPARATUS, SYSTEMS, AND METHODS

(71) Applicant: HEALTH RESEARCH, INC., Menands, NY (US)

(72) Inventors: John Paccione, Troy, NY (US); David Dziewulski, Troy, NY (US)

(73) Assignee: Health Research, Inc., Menands, NY (US)

( * ) Notice: Subject to any disclaimer, the term of this patent is extended or adjusted under 35 U.S.C. 154(b) by 0 days.

(21) Appl. No.: 18/249,671

(22) PCT Filed: Nov. 22, 2021

(86) PCT No.: PCT/US2021/060341
§ 371 (c)(1),
(2) Date: Apr. 19, 2023

(87) PCT Pub. No.: WO2022/109392
PCT Pub. Date: May 27, 2022

(65) Prior Publication Data
US 2024/0009593 A1     Jan. 11, 2024

Related U.S. Application Data

(60) Provisional application No. 63/117,000, filed on Nov. 23, 2020.

(51) Int. Cl.
*B01D 15/02* (2006.01)
*B01D 15/20* (2006.01)
(Continued)

(52) U.S. Cl.
CPC .......... *B01J 20/3441* (2013.01); *B01D 15/02* (2013.01); *B01D 15/203* (2013.01); *C02F 1/281* (2013.01);
(Continued)

(58) Field of Classification Search
None
See application file for complete search history.

(56) References Cited

U.S. PATENT DOCUMENTS

| 5,626,763 A | 5/1997 | Mathews |
| 5,749,684 A | 5/1998 | Feja |

(Continued)

FOREIGN PATENT DOCUMENTS

| EP | 3646946 A1 | 6/2020 |
| WO | 2020205635 A1 | 10/2020 |

OTHER PUBLICATIONS

Bang et al. (Chemosphere, 2005, 60, 389-397. (Year: 2005).*

(Continued)

*Primary Examiner* — Clare M Perrin
(74) *Attorney, Agent, or Firm* — Stephen P. Scuderi; Heslin Rothenberg Farley & Mesiti PC

(57) ABSTRACT

The present disclosure relates to a fluid treatment apparatus. The fluid treatment apparatus includes a first system for removing one or more target compounds from a fluid, said first system comprising adsorbent particles; a second system for regenerating said adsorbent particles; a first connector between said first system and said second system, said first connector configured to transfer adsorbent particles from said first system to said second system; and a second connector between said first system and said second system, said second connector configured to release of adsorbent particles from said second system, wherein said first system and said second system are decoupled. The present disclosure further relates to a system comprising one or more fluid treatment apparatus described herein. Also described herein are methods for treating fluid and a system comprising the methods for treating fluid described herein.

29 Claims, 7 Drawing Sheets

(51) Int. Cl.

| | |
|---|---|
| *B01J 20/34* | (2006.01) |
| *C02F 1/28* | (2023.01) |
| *C02F 1/32* | (2023.01) |
| *C02F 1/36* | (2023.01) |
| *B01J 20/08* | (2006.01) |
| *B01J 20/10* | (2006.01) |
| *B01J 20/20* | (2006.01) |
| *C02F 1/70* | (2023.01) |
| *C02F 101/30* | (2006.01) |
| *C02F 101/34* | (2006.01) |
| *C02F 101/36* | (2006.01) |

(52) U.S. Cl.
CPC ............... *C02F 1/32* (2013.01); *C02F 1/36* (2013.01); *B01J 20/08* (2013.01); *B01J 20/103* (2013.01); *B01J 20/20* (2013.01); *C02F 1/70* (2013.01); *C02F 2101/301* (2013.01); *C02F 2101/305* (2013.01); *C02F 2101/345* (2013.01); *C02F 2101/36* (2013.01); *C02F 2303/16* (2013.01); *C02F 2305/10* (2013.01)

(56) References Cited

U.S. PATENT DOCUMENTS

| | | |
|---|---|---|
| 7,641,798 B2 | 1/2010 | Yamasaki et al. |
| 2005/0173347 A1 | 8/2005 | Hintzer et al. |
| 2006/0189475 A1 | 8/2006 | Petrik et al. |
| 2008/0130399 A1* | 6/2008 | Littman ................ B01F 23/60 366/132 |
| 2019/0185352 A1 | 6/2019 | Chiang |
| 2020/0171409 A1 | 6/2020 | Cho |
| 2020/0316560 A1 | 10/2020 | Distefano et al. |

OTHER PUBLICATIONS

Littman et al., "New type of draft tube spout-fluid bed. Part 1: Hydraulic transport of 1.94 mm glass particles in water." Industrial & Engineering Chemistry Research 48.20 (Oct. 21, 2009): 9286-9298. Abstract only.

International Search Report and Written Opinion of International Application No. PCT/US2021/060341, 16 pages.

Qian et al., "Degradation of perfluorooctanoic acid adsorbed on Fe-zeolites with molecular oxygen as oxidant under UV-A irradiation," Applied Catalysis B: Environmental, 2020, vol. 278: 1119283. Abstract only.

Kucharzyk et al., "Novel treatment technologies for PFAS compounds: A Critical Review," Journal of Environmental Management, 2017, vol. 1-8.

Wang et al., Photocatalytic degradation of perfluorooctanoic acid and perfluorooctane sulfonate in water: A critical review, Chemical Engineering Journal, 2017, vol. 328: pp. 927-942.

Gole et al., "Treatment of perfluorooctane sulfonic acid (PFOS) using a large-scale sonochemical reactor," Separation and Purification Technology, 2018, vol. 194: pp. 104-110.

* cited by examiner

FLUID TREATMENT APPARATUS, SYSTEMS, AND METHODS

CROSS REFERENCE TO RELATED APPLICATIONS

This application is a U.S. National Phase filing under 35 U.S.C. § 371 of International Application PCT/US2021/060341, filed Nov. 22, 2021, and published as WO 2022/109392 A1 on May 27, 2022. PCT/US2021/060341 claims priority from U.S. provisional application No. 63/117,000, filed Nov. 23, 2020. The entire contents of each of these prior applications are hereby incorporated herein by reference.

FIELD

The present disclosure relates to a fluid treatment apparatus, systems, and methods.

BACKGROUND

Per- and poly-fluorinated alkyl substances (PFAS) have been produced industrially and used for a variety of industrial and commercial applications including aqueous firefighting foams (AFFF), surfactants, fabric stain retardants and in a variety of other commercially important materials. Firefighting efforts for oil and other chemicals are improved using PFAS surfactants because they improve wetting of the fuel supply and resist high temperature decomposition. From an environmental perspective, PFAS become fugitives during firefighting exercises and during industrial processing with the result they find their way into the soil and water supplies. The strong carbon-fluorine (C—F) bond that makes these compounds stable in high temperature environments also makes them extremely slow to decompose in the environment and in the bodies of humans and animals. This is problematic because PFOA and PFOS (the two most-studied PFAS) have been shown to be toxic to humans and have been associated with several health effects including increased cholesterol levels; low infant birth weights; effects on the immune system; liver and kidney damage; cancer (for PFOA); and thyroid hormone disruption (for PFOS). See "Basic Information on PFAS," United States Environmental Protection Agency.

The contamination of the environment by PFAS even in low concentrations has been determined to be a threat to public health. For this reason, governing bodies such as the United States Environmental Protection Agency and state governments have begun promulgating regulations that limit the maximum contaminant levels of several PFAS, specifically PFOA and PFAS, in water.

Recently, there has been a significant amount of activity in the development of methods of removing and destroying PFAS materials from the environment to prevent secondary pollution. There are at least three applications for environmentally safe methods for destroying PFAS including (1) the treatment of drinking water, (2) the treatment of wastewater and manufacturing waste streams, and (3) the destruction of existing inventories of aqueous firefighting foam (AFFF) concentrate. The treatment of drinking water is often accomplished by stripping the PFAS from the water using a suitable adsorbent such as activated carbon or another adsorbent with the appropriate selectivity. However, this can be a short-term solution as the adsorbent must be either regenerated or discarded, which may allow environmental recontamination at a future time. Disposal of unused AFFF presents an even more significant problem because the amount of material in the concentrate is approximately 3-6% making it a potential source for future environmental contamination. Therefore, there is a pressing need to develop water and wastewater treatment processes and AFFF destruction methods that are efficient, cost effective, and scalable.

Methods of destroying PFAS include incineration (Lee et al., "Promoted Degradation of Perfluorooctanic Acid by Persulfate When Adding Activated Carbon," *Journal of Hazardous Materials* 261:463-69 (2013)), electrochemical reaction (Liang et al., "Electrochemical Oxidation of PFOA and PFOS in Concentrated Waste Streams," *Remediation Journal* 28(2):127-134 (2018)), application of plasma to water (Lewis et al., "Rapid Degradation of PFAS in Aqueous Solutions by Reverse Vortex flow Gliding Arc Plasma," *Environmental Science: Water Research & Technology* 6(4): 1044-1057 (2020) and Singh et al., "Breakdown Products From Perfluorinated Alkyl Substances (PFAS) Degradation in a Plasma-Based Water Treatment Process," *Environmental Science & Technology* 53(5):2731-2738 (2019)), advanced reduction processes (Cui et al., "Destruction of Per- and Polyfluoroalkyl Substances (PFAS) With Advanced Reduction Processes (ARPs): A Critical Review," *Environ. Sci. Technol.* 54(7):3752-66 (2020)), supercritical oxidation which requires both elevated temperature and pressure, ionizing radiation (i.e., gamma) and photocatalytic oxidation and/or reduction processes. Xu et al., "Photocatalytic Removal of Perfluoroalkyl Substances From Water and Wastewater: Mechanism, Kinetics and Controlling Factors," *Chemosphere* 189:717-729 (2017); Sansotera et al., "The Effect of Oxygen in the Photocatalytic Oxidation Pathways of Perfluorooctanoic Acid," *Journal of Fluorine Chemistry* 179:159-168 (2015); and Trojanowicz et al., "Advanced Oxidation/Reduction Processes Treatment for Aqueous Perfluorooctanoate (PFOA) and Perfluorooctanesulfonate (PFOS)—A Review of Recent Advances," *Chemical Engineering Journal* 336:170-199 (2018).

One of the methods of interest for destroying PFAS, regardless of its source, involves the use of light-activated photocatalytic processes which may be used to mineralize PFAS into non or less toxic substances such as carbon dioxide, sulfate ions ($SO_4^{2-}$), phosphate ions ($PO_4^{3-}$), and fluoride ions ($F^-$). The degradation process occurs in two steps. The first entails adsorption of the PFAS/target compound onto the photocatalytic/adsorbent material (which is a solid particle). The second step involves illumination with activating energy to induce reactions which decompose the PFAS and regenerate the adsorbent. As with any multiphase reaction, the proper fluid-particle mechanics is essential to make the process effective. Barriers to good process efficiency and efficient scaling of reactors include the ability to simultaneously provide sufficient mass transfer surface area and sufficient illumination time of the photocatalytic adsorbent.

Photocatalytic processes involving semiconductors have several attributes that make them attractive for processing AFFF liquids as well as PFAS tainted waters. They operate at or near ambient temperatures and pressures, they use non-toxic or low toxicity materials (e.g., titania is used as a food additive and is found in both cosmetics and drugs) and the process produces low or non-toxic materials such as water, carbon dioxide, sulfate ions and fluoride ions.

The most commonly studied reactor designs utilize either a slurry of photocatalytic material, or immobilized photocatalytic material on a substrate (i.e., monolithic design).

Most reactor designs reside on this slurry-monolith design spectrum, and both have strengths as well as weaknesses as shown in Table 1.

TABLE 1

Traditional Reactor Design Summary.

| Process issue | Slurry | Monolith |
|---|---|---|
| Mass transfer | High | Low |
| Light transmission | Limited by the concentration of photocatalytic adsorbent. Decreasing the photocatalytic adsorbent concentration competes with the mass transfer surface area | High |
| Adsorption capacity per unit reactor volume | Low to high depending on the concentration of the photocatalytic adsorbent | Usually low |
| Scalability | Requires large numbers of lamps for large volume reactors | Difficult to scale depending on the method and structure on which the photocatalytic adsorbent is immobilized |
| Downstream process | Requires separation and recycling of the photocatalytic adsorbent material. This often involves a membrane process and therefore elevated pressure drops | No separation of photocatalytic adsorbent material necessary |

The throughput of a photocatalytic reactor is ultimately determined rate at which the PFAS/target compound is decomposed. Photocatalytic degradation requires two steps: (1) adsorption of the PFAS/target compound onto the surface where decomposition will occur, and (2) the decomposition of the PFAS/target compound on the adsorbent. Any reactor design will balance the decomposition and adsorption rates. The rate at which PFAS/target compound molecules will adsorb onto the surface of the adsorbent is equal to the rate at which the adsorbent is regenerated.

The amount of PFAS/target compound that needs to be removed from the water is determined by: (1) the concentration of the PFAS/target compound in the raw water, (2) the desired concentration of PFAS/target compound in the finished water, and (3) the volumetric flow rate of water being treated. This determines the amount of PFAS/target compound to be decomposed in the regeneration phase of the process. Therefore, for a reactor to function properly, it must first use an adsorbent that has an affinity for the PFAS/target compound and have sufficient adsorptive capacity to strip the PFAS/target compound from the water. A reactor that uses an adsorbent with no affinity for the PFAS/target compound will not function at all as a water treatment device, and the water will pass through unaffected. Once the PFAS/target compound has been adsorbed onto the adsorbent, it can then be decomposed via a photo-activated or other type of decomposition process run in a separate regenerator. The rate at which the water can be introduced into the reactor is then determined by the rate at which the PFAS/target compound is decomposed thereby leaving space on the adsorbent.

Many photocatalytic reactors described in the literature are based on equipment where the adsorption and decomposition processes are run in the same vessel. They are usually categorized as either slurry or monolithic reactors, and both configurations are difficult to scale. The characteristic capacity of a reactor will be determined by the process bottleneck which will be either the adsorption or decomposition step in the process. The adsorption phase of the reaction is determined by the equilibrium adsorptive capacity of the adsorbent, the mass transfer rate and the concentration of the adsorbent itself. The regeneration rate is determined by the intensity of the light used for regeneration, the decomposition kinetics, and the availability of any other reactants such as oxygen or hydroxide ions needed for the decomposition process to occur. It may be difficult to ascertain which of the two processes is limiting, and when it is determined, it is difficult to allocate process resources to improve the process throughput. For example, a monolithic reactor will have limited mass transfer surface area, but the regeneration rate will be as rapid as the decomposition kinetics will allow. Improved mass transfer can then be made by increasing the surface area for adsorption, but then the amount of light provided will also be required to increase. This type of reactor will be very difficult to scale because the interfacial surface area per unit volume is small and it will require disassembly of the reactor in order to change the photocatalytic adsorbent as it is often built into the structure of the equipment itself.

An alternative design places the photocatalytic adsorbent into the water as a suspension of fine particles (e.g. 25 micron adsorbent particles). This provides larger amounts of liquid-solid surface area, but the solids absorb the light making it difficult to provide illumination at locations distance from the light source. Those particles in the lower intensity regions of the vessel will have a lower regeneration rate, which will affect the reactor performance. To improve the kinetics of decomposition, it may be necessary to reduce the concentration of the photocatalytic adsorbent, which reduces the mass transfer surface area, or add additional lights. Either way, one method of attempting to optimize the reaction affects other aspects of the process making full optimization and scaleup challenging. Additionally, some decomposition processes require the addition of other reagents such as oxygen, hydrogen peroxide, or pH modifying chemicals. Running both adsorption and decomposition in the same vessel requires altering the chemistry of the entire process stream of water, which is both costly and inefficient. An inherent flaw of slurry reactors is the propensity for mixing of recently regenerated and existing photocatalytic adsorbent which makes the reactor inherently inefficient. Attempts to correct this require the thoughtful design of the hydraulic behavior of the reactor to reduce the effects of mixing.

In summary, the reactor designs discussed above have significant limitations in their ability to be scaled and controlled in instances where process conditions change. The present disclosure is directed to overcoming these and other deficiencies in the art by providing a means for decoupling the adsorption and decomposition process. This will allow process resources to be allocated individually as needed. It will also allow for more efficient process control and optimization.

SUMMARY

A first aspect of the present disclosure relates to a fluid treatment apparatus. The fluid treatment apparatus includes a first system for removing one or more target compounds from a fluid, said first system comprising adsorbent particles; a second system for regenerating said adsorbent particles; a first connector between said first system and said second system, said first connector configured to transfer adsorbent particles from said first system to said second system; and a second connector between said first system and said second system, said second connector configured to release of adsorbent particles from said second system, wherein said first system and said second system are decoupled.

A second aspect of the present disclosure relates to a system comprising one or more fluid treatment apparatus described herein.

A third aspect of the present disclosure relates to a method for treating fluid. The method includes providing fluid comprising one or more target compounds; removing said one or more target compounds from said fluid in a first system comprising adsorbent particles; regenerating said adsorbent particles in a second system; providing a first connector between said first system and said second system, said connector configured to transfer said adsorbent particles from said first system to said second system; and providing a second connector between said first system and said second system, said second connector configured to release of adsorbent particles from said second system, wherein said first system and said second system are decoupled, under conditions effective to treat said fluid.

A fourth aspect of the present disclosure relates to a system comprising the method for treating fluid described herein.

In this disclosure, a reactor design is introduced that performs fluid (e.g., water) treatment in a two-step process that strips a target material (e.g., a constituent of the fluid, such as PFAS) and decomposes it resulting in few if any toxic byproducts. When these processes are run efficiently, the downstream byproducts will include: water, carbon dioxide, sulfate ions ($SO_4^{2-}$), phosphate ions ($PO_4^{3-}$), and fluoride ions ($F^-$). There is little concern regarding the discharge of any of the ions listed because all of them are found in water naturally. If there is any concern regarding the discharge of fluoride ions from the process, they can be readily sequestered by reacting them with calcium ions which produces calcium fluoride, an insoluble precipitate and a naturally occurring mineral called fluorite or fluorspar.

The process described here focuses on a two-step liquid-solids apparatus, systems, and processes that may be run concurrently and continuously. The first step entails stripping a target compound (e.g., PFAS) from a fluid (e.g., water) and onto a solid substrate (e.g., adsorbent particles) using a concurrent or countercurrent mechanism. The second step involves regenerating of the adsorbent using a method that is kinetically favorable and produces substances that are innocuous to the environment and human health.

In the novel reactor described herein, adsorption and adsorbent regeneration processes and the fluid mechanics in the two reactor sections are decoupled. The decoupling process allows process resources to be allocated to the portion of the process that is process limiting (a bottleneck). The decoupling of the fluid mechanics in the adsorption and regeneration sections of the system allows the processes there to be optimized individually. The reactor system has been modeled for other processes and is based on a fluid-particle contact system that provides maximum process flexibility and efficiency.

DETAILED DESCRIPTION

Figure 1:
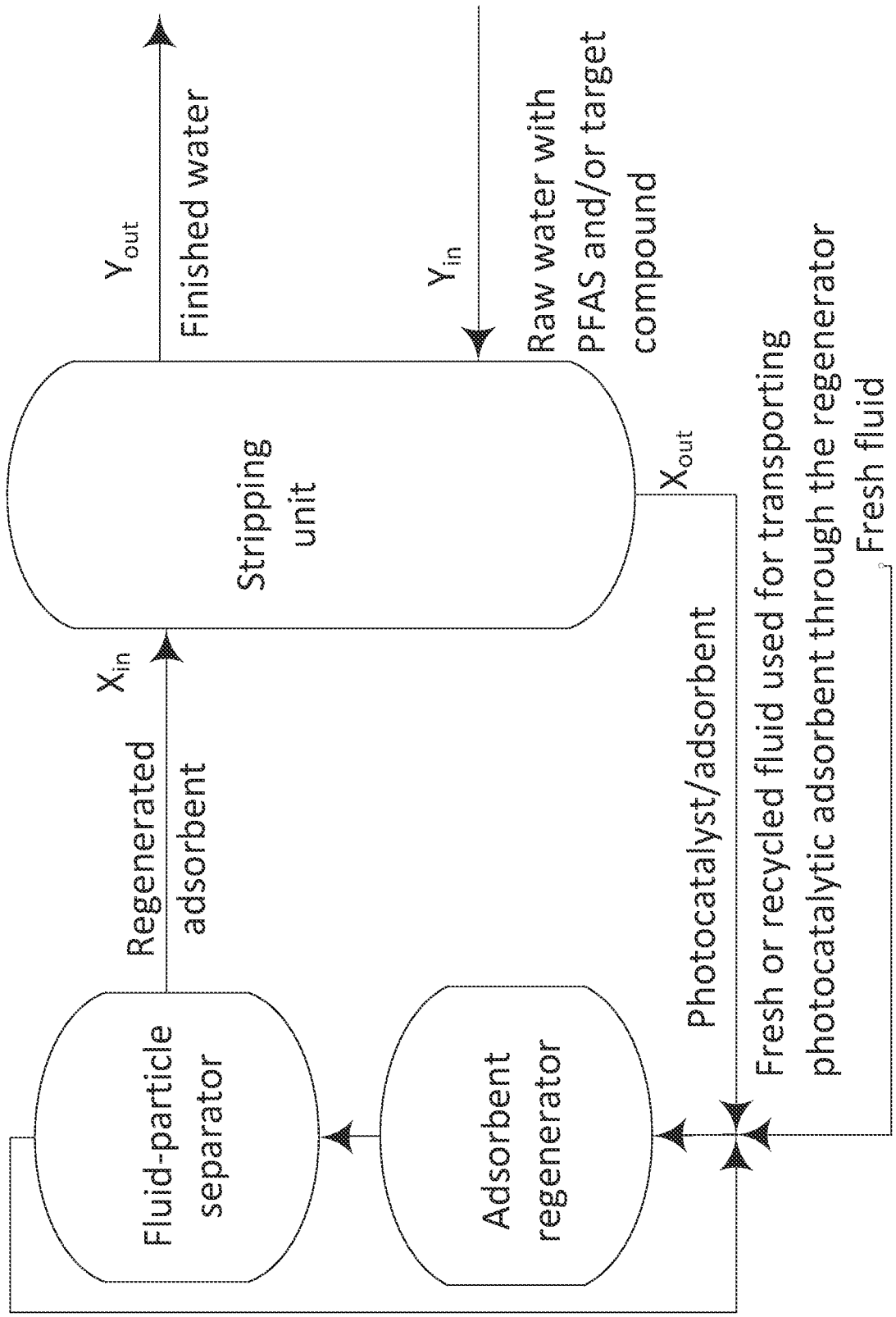
FIG. 1 depicts a schematic representation of a water treatment process described herein, in particular, a two-step process, where the two steps are run concurrently and continuously. The two steps include: (1) stripping of the target compound (e.g., PFAS) from a fluid (e.g., water) using an adsorbent with an affinity for the target compound, and (2) regeneration of the adsorbent using a method that is kinetically favorable (the amount of time is reasonable) and produces substances that are innocuous to the environment.

A first aspect of the present disclosure relates to a fluid treatment apparatus. The fluid treatment apparatus includes a first system for removing one or more target compounds from a fluid, said first system comprising adsorbent particles; a second system for regenerating said adsorbent particles; a first connector between said first system and said second system, said first connector configured to transfer adsorbent particles from said first system to said second system; and a second connector between said first system and said second system, said second connector configured to release of adsorbent particles from said second system, wherein said first system and said second system are decoupled.

It is to be appreciated that certain aspects, modes, embodiments, variations, and features of the present disclosure are described below in various levels of detail in order to provide a substantial understanding of the present technology. The definitions of certain terms as used in this specification are provided below. Unless defined otherwise, all technical and scientific terms used herein generally have the same meaning as commonly understood by one of ordinary skill in the art to which this disclosure belongs.

As used herein, the term "about" means that the numerical value is approximate and small variations would not significantly affect the practice of the disclosed embodiments. Where a numerical limitation is used, unless indicated otherwise by the context, "about" means the numerical value can vary by ±1 or ±10%, or any point therein, and remain within the scope of the disclosed embodiments.

Where a range of values is described, it should be understood that intervening values, unless the context clearly dictates otherwise, between the upper and lower limit of that range and any other stated or intervening value in other stated ranges, may be used in the embodiments described herein.

As used herein, the terms "subject", "individual", or "patient," are used interchangeably, and mean any animal, including mammals, such as mice, rats, other rodents, rabbits, dogs, cats, swine, cattle, sheep, horses, or primates, such as humans.

It is further appreciated that certain features described herein, which are, for clarity, described in the context of separate embodiments, can also be provided in combination in a single embodiment. Conversely, various features which are, for brevity, described in the context of a single embodiment, can also be provided separately or in any suitable sub-combination.

As described herein, a first system includes one that is capable of removing one or more target compounds from a fluid.

A target compound as described herein may include any compound that is sought to be removed from a fluid. The target compound may be any compound that is known to or suspected of producing adverse or negative health effects in subjects such as human subjects, even when present in small or trace quantities and/or is undesirable from an aesthetic perspective (e.g., present an unsavory flavor or odor to a given fluid). For example, per- and poly-fluoroalkyl substances (PFAS) including perfluorooctanoic acid (PFOA) and Perfluorooctanesulfonic (PFOS), and other recalcitrant highly stable organic compounds, substances, organic matter, infectious pathogens, endocrine disruptors, pharmaceutical, and otherwise oxidizable material in water, aqueous fluids, condensates, and concentrates, may be target compounds in accordance with the apparatus, systems, and methods disclosed herein. In one embodiment, PFAS compounds are target compounds that may be removed from a fluid in accordance with the apparatus, systems, and methods described herein. In one embodiment, the one or more target compounds comprise at least one per- or polyfluoroalkyl substances (PFAS), 1,4-dioxane, organic compounds, pesticides, herbicides, natural organic matter (NOM), disinfection byproducts, disinfection byproduct precursors (DBP), personal care products, pharmaceuticals, plasticisers, bispenol-A (BPA), endocrine disrupting chemicals (EDC), inorganic metals, or any combination thereof. PFAS substances that may be target compounds in accordance with the apparatus and methods described herein include, for example, those listed by the United States Environmental Protection Agency PFAS Master List of PFAS Substances (Version 2), which is hereby incorporated by reference in its entirety. The target compound may further include other pharmaceutical compounds and substances, or any combination thereof.

A large source of emerging contaminants are pharmaceuticals and personal care products (PPCPs), endocrine disrupting chemicals (EDCs), plasticisers (e.g., bisphenol-A), flame-retardants, fuel additives, and other industrial organic products. Al-Mashaqbeh et al., "Removal of Selected Pharmaceuticals and Personal Care Products in Wastewater Treatment Plant in Jordan," *Water* 11:2004 (2019), which is hereby incorporated by reference in its entirety. PPCPs have been detected in all environmental compartments, such as water, soil, air, biota, and wastewater at concentrations ranging from sub-ng/L levels to µg/L. Id. The presence of these compounds in the environment has been shown to result in adverse ecological and health risks for the exposed biota and humans, even at very low concentrations (ng/L range). Id. The apparatus, systems, and methods described herein may be useful in removing one or more target compounds that are contaminants in water.

In one embodiment, the one or more target compounds comprise at least one per- or polyfluoroalkyl substances (PFAS), and examples of PFAS include perfluorooctane sulfonate (PFOS) and perfluorooctanoic acid (PFOA). As used herein, the term "perfluoroalkyl and polyfluoroalkyl substances (PFAS)" means any perfluoroalkyl or polyfluoroalkyl substance, mixture of such substances, or derivative of one or more such substances. Examples of PFAS include perfluoroalkyl sulfonate, perfluoroalkane sulfonic acid (PFSA), N-Butyl perfluoroalkane sulfonamide (BuFASA), N-Butyl perfluoroalkane sulfonamido ethanols (BuFASE), N-Butyl perfluoroalkane sulfonamido acetic acid (BuFASAA), N-Ethyl perfluoroalkane sulfonamide (EtFASA), N-Ethyl perfluoroalkane sulfonamido ethanol (EtFASE), N-Ethyl perfluoroalkane sulfonamido acetic acid (EtFASAA), perfluoroalkane sulfonamide (FASA), Perfluoroalkane sulfonamido ethanol (FASE), Perfluoroalkane sulfonamido acetic acid (FASAA), N-Methyl perfluoroalkane sulfonamide (MeFASA), N-Methyl perfluoroalkane sulfonamido acetic acid (MeFASAA), N-Methyl perfluoroalkane sulfonamido ethanol (MeFASE), N-Methyl perfluorooctane sulfonamide (MeFOSA), perfluoroalkane sulfonyl fluoride (PASF), 4,8-dioxa-3H-perfluorononanoate, ammonium perfluorooctanoate (APFO), fluoroprotein (FP), fluorotelomer carboxylic acid (FTCA), fluorotelomer alcohol (FTOH), fluorotelomer sulfonate (FTS), fluorotelomer sulfonic acid (FTSA), perfluoroalkyl acid (PFAA), perfluoroalkylsulfonamidoethanol (PFOSE), and any derivatives thereof. These include, for example and without limitation, perfluorooctanoic acid (PFOA), perfluorooctane sulfonate, perfluorooctanesulfonic acid (PFOS), 2,3,3,3-tetrafluoro-2-(heptafluoropropoxy)propanoate, ammonium 2,3,3,3-tetrafluoro-2-(heptafluoropropoxy)propanoate, 1,2,2,2-tetrafluoroethyl ether, 4:2-Fluorotelomersulfonic acid (4:2 FtS), 6:2-Fluorotelomersulfonic acid (6:2 FtS), 8:2-fluorotelomersulfonic acid (8:2 FtS), perfluorobutanoic acid (PFBA), perfluorobutane sulfonate, perfluorobutane sulfonic acid (PFBS), perfluorohexane sulfonate, perfluorohexane sulfonic acid (PFHxS), perfluorohexanoate, perfluorohexanoic acid (PFHxA), 4,8-dioxa-3H-perfluorononanoate, ammonium perfluorooctanoate (APFO), N-Ethyl perfluorooctane sulfonamide (EtFOSA), N-Ethyl perfluorooctane sulfonamido ethanol (EtFOSE), perfluorooctane sulfonamide (PFOSA), perfluorooctane sulfonamido acetic acid (FOSAA), perfluorooctane sulfonamido ethanol (FOSE), perfluorobutanoate, perfluorobutanoic acid, perfluorobutyrate, perfluorobutyric acid, perfluoroalkyl carboxylate, perfluoroalkyl carboxylic acid (PFCA), perfluorodecanoate, perfluorodecanoic acid (PFDA), perfluorododecanoate, perfluorododecanoic acid (PFDoA), perfluorododecane sulfonate (PFDoS), perfluorododecane sulfonic acid (PFDoSA), perfluorodecane sulfonate, perfluorodecane sulfonic acid (PFDS), perfluoroheptanoate, perfluoroheptanoic acid (PFHpA), perfluoroheptane sulfonate, perfluoroheptane sulfonic acid (PFHpS), perfluorononanoate, perfluorononanoic acid (PFNA), perfluorononane sulfonate, perfluorononane sulfonic acid (PFNS), perfluorooctanoate, perfluorophosphonic acid (PFPA), perfluoropentanoate, perfluoropentanoic acid (PFPeA), perfluoropentane sulfonate, perfluoropentane sulfonic acid (PFPeS), perfluorophosphinic acid (PFPiA), Perfluorotetradecanoic acid (PFTeDA), Perfluorotridecanoic acid (PFTrDA), perfluoroundecanoate, perfluoroundecanoic acid (PFUnA), perfluoroundecane sulfonate (PFUnS), perfluoroundecane sulfonic acid (PFUnSA), or polytetrafluoroethylene (PTFE). For a list of examples of PFAS, see U.S. Patent Publication No. 2020/0316560 to Distefano et al., which is hereby incorporated by reference in its entirety.

The apparatus described herein may be used to treat any fluid, including for example, a liquid or a gas. The fluid described herein may, in one embodiment, include a fluid stream. In one embodiment, the fluid treatment apparatus is a water treatment apparatus. The apparatus, systems, and methods described herein can be applied in-line/in-stream on impacted water, aqueous fluids, wastewater, condensates, concentrates, process streams, and brines. The resulting fluid after passing through the fluid treatment apparatus described herein may produce a fluid that is innocuous to the environment or contains a reduced concentration of one or more target compounds.

The first system of the fluid treatment apparatus as described herein includes adsorbent particles. Adsorbent particles as described herein may include any particle capable of having affinity for one or more target compounds. In particular, adsorbent particles may enter the first system of the fluid treatment apparatus during which time the first system may remove one or more target compounds from a fluid by use of adsorbent particles. After adsorbent particles remove one or more target compounds from a fluid, those adsorbent particles adsorb the target compounds and, in doing so, thereby include the one or more target compounds on the surface and/or molecular interstices of the adsorbent particles. The one or more target compounds in one embodiment may be adsorbed onto the adsorbent particles. The adsorbent particles may include one or more target compounds and the adsorbent particles may, in one embodiment, carry one or more target compounds.

These adsorbent particles comprising one or more target compounds may also be referred to herein as "spent" adsorbent particles. The spent adsorbent particles may be fully spent or partially spent, and the fraction of adsorbent particles that are spent will depend on a number of factors including the dimensions of the systems and connectors in the fluid treatment apparatus described herein as well as the various compounds used in the apparatus. The degree to which the particles are spent will depend on a number of factors including the dimensions of the systems and connectors in the fluid treatment apparatus, the concentration of the target compound(s) in the incoming fluid, the ratio of the solids to fluid flow rates (Gp/Gf) and the decomposition kinetics, the fluid velocity in the second system, the particle velocity in the second system, the UV light intensity in the second system, among others.

For example, adsorbent particles as described herein may include any particle having an affinity for one or more PFAS compounds, which are examples of target compounds that may be removed from a fluid in accordance with the systems and apparatuses described herein. In one embodiment, the adsorbent particles can be a beta-zeolite (silicalite, and all-silica zeolite) or any other adsorbent which has an affinity for hydrophobic compounds. In one embodiment, the adsorbent particles comprise at least one of zeolites, clays, cyclodextrins, activated silica, activated alumina, ion exchange resins, activated carbon (including, for example, powdered and/or granular activated carbon), reactivated carbon, affinity beads, silica gel, molecular sieves, polymeric materials, photocatalysts, engineered particles, metal oxides, semiconductors, or any combination thereof. Adsorbent particles, in one embodiment, may have a diameter of between 0.01 mm and 5.0 mm, or be of any diameter suitable for adsorbing one or more target compounds.

Examples of materials useful in the composition of adsorbent particles include materials such as carbonaceous char, activated carbon, reactivated carbon, carbon black, natural and synthetic zeolites, silica, silica gel, alumina, alumina clay, zirconia, diatomaceous earths, or metal oxides. The adsorbent materials may be used alone or in combination. In some embodiments where adsorbent materials are used in combination, multiple adsorbents are mixed together; such adsorbents can be the same or different. In some embodiments, the adsorbent material is activated carbon or reactivated carbon. In such embodiments, the activated or reactivated carbon may be prepared from any precursor carbonaceous material known in the art including, but not limited to bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, polymer fibers, and any other carbonaceous material or combinations thereof. Grades and types of activated carbon or reactivated carbon may be selected based on performance requirements, cost, and other considerations. See U.S. Patent Publication No. 2020/0316560 to Distefano et al., which is hereby incorporated by reference in its entirety.

The first system may be based on a counter-current moving (packed) bed where the solids are not fluidized, though in an alternative embodiment they can be fluidized, where the water is stripped of the one or more target compounds. The moving bed, in one embodiment, may be neither fluidized nor sedimenting. The adsorbent particles may be solid and may include a material that has an affinity for one or more target compounds. The fluid (e.g., water) entering the bottom of the counter-current moving bed may contain the one or more target compounds. As the fluid moves upward through the interstices of the packed bed, the one or more target compounds may be adsorbed onto the solid particles and thereby removed from the stream of water. The effluent fluid at the top of the moving bed may thereby be free of or have a lower quantity of the one or more target compounds. In one embodiment, the effluent fluid meets a treatment specification for the fluid (e.g., drinking water specifications).

The first system of the fluid treatment apparatus described herein may include, for example, a vessel that comprises adsorbent particles. The vessel may be of any suitable shape for housing a one or more adsorbent particles. The first system of the fluid treatment apparatus described herein may include, in one embodiment, a first fluid inlet positioned to accept fluid into said first system; and a first fluid outlet positioned for treated fluid to exit said first system. The first fluid inlet may be used for fluid entry that contains the one or more target compounds (e.g., a contaminated or untreated water supply). The first fluid outlet may be used for fluid exiting after removal of one or more target compounds (e.g., water that has been treated and is free or having lower quantities of one or more target compounds).

In one embodiment, the first system of the fluid treatment apparatus described herein may include a first adsorbent outlet positioned for adsorbent particles to exit said first system; and a first adsorbent inlet positioned for adsorbent particles to enter said first system. The first adsorbent outlet described herein is positioned such that adsorbent particles that comprise one or more target compounds adsorbed onto the adsorbent particle (e.g., spent adsorbent particles) may exit the first system and engage in further processing in the apparatus. The first adsorbent inlet described herein is positioned such that adsorbent particles that have been regenerated, which is described herein, or adsorbent particles that have not yet contacted one or more target compounds, may enter the first system. In one embodiment, the first system is a stripping system.

A function of the adsorption process is to remove the one or more target compounds from the fluid to isolate those target compounds onto the adsorbent. This then, in one embodiment, allows the destruction process of the target compound to proceed without the interference of other compounds that may be acceptable in the fluid, but would possibly interfere with the destruction process.

A first connector as described herein includes a connector between the first system and the second system, and is configured to transfer adsorbent particles from the first system to the second system. In particular, the first connector may be configured to transfer the spent adsorbent particles (e.g., the adsorbent comprising one or more target compounds on the surface of the adsorbent particle) into the second system. The first connector may include a fluid inlet to introduce fluid used to convey spent particles through the second system. The first connector may also contain a control device to regulate the solids mass flow rate of spent particles from said first system to said second system. The control device may be a pressure regulator or a non-mechanical valve such as a J-valve used for regulating the solids mass flow rate of solids in circulating fluidized beds. The first connector may also contain a control device to regulate the pressure at the inlet to the said second system.

In one embodiment, the apparatus further comprises a process control system. In one embodiment, the process control system comprises one or more control valve. In one embodiment, the one or more control valve is configured to specify a fluid flow rate into said first system. In one embodiment, the one or more control valve is configured to specify a flow rate into said second system. In one embodiment, the one or more control valve is configured to specify a flow rate into said first connector. In one embodiment, the one or more control valve is configured to specify a flow rate into said second connector. In one embodiment, the one or more control valve is configured to specify a pressure in said first system. In one embodiment, the one or more control valve is configured to specify a pressure in said second system. In one embodiment, the one or more control valve is configured to specify a pressure in said first connector. In one embodiment, the one or more control valve is configured to specify a pressure in said second connector.

A second system of the fluid treatment apparatus as described herein is a system for regenerating adsorbent particles, in particular, for regenerating adsorbent particles that comprise one or more target compounds adsorbed onto the adsorbent particle (e.g., spent adsorbent particles). The spent adsorbent particles may exit the first system then enter the second system (e.g., via the first connector), which is configured to regenerate the spent adsorbent particles. The adsorbent particles may be fully regenerated or partially regenerated in the second system, and the fraction of adsorbent particles and degree to which they are regenerated will depend on a number of factors including the dimensions of the systems and connectors in the fluid treatment apparatus, the particle phase velocity (residence time in the second system), UV light intensity, concentration of chemical species used to regenerate or assist in the regeneration of the particulate adsorbent, as well as the compounds used in the apparatus. In one embodiment, the second system is a regeneration system.

The second system may include a first riser inlet positioned to accept adsorbent particles; a second fluid inlet positioned to accept a fluid in said first riser inlet; a riser comprising a conduit to transport adsorbent particles; and a first riser outlet configured to convey adsorbent particles to exit the second system. The first riser inlet is particularly useful for accepting spent adsorbent particles, or adsorbent particles comprising one or more target compounds. The spent adsorbent may pass through a riser which may be in the form of a conduit and the spent adsorbent may undergo regeneration while passing through the riser and/or conduit. The riser may include a fluid that enters the bottom of the inlet system to carry the particles upward through the riser. The riser may also be configured to decompose or destroy the one or more target compounds adsorbed on the adsorbent particles entering the second system through the first riser inlet. The riser may be any suitable shape, for example a vertical shape or horizontal or cylindrical shape or a serpentine shape and the riser may have any variation of length useful for the particular application of the apparatus. The length and shape of the riser is variable and the most suitable length and shape will depend on a variety of factors, for example, which compound is being targeted for decomposition, which adsorbent particles are used, what if any energy is delivered by the second system, the fraction of target compound specified for decomposition, and others. The physical parameters of the second system (as well as the first system, the first connector, and the second connector) may be optimized for best results depending on these factors. The first riser outlet may be configured to release regenerated adsorbent particles out of the second system. In one embodiment, the regenerated adsorbent particles exit the second system and enter a second connector.

The second connector is located between the first system and the second system. The second connector described herein may be configured to release of adsorbent particles from the second system. In one embodiment, the second connector as described herein is configured to regenerate the spent adsorbent particles, which is described infra. In one embodiment, the second connector is configured to release adsorbent particles, in particular, regenerated adsorbent particles, and transfer those adsorbent particles back to the first system. In another embodiment, the second connector is configured to release adsorbent particles, in particular, regenerated adsorbent particles, to a separate device, vessel, or apparatus. In one embodiment, the second connector is further configured to separate one or more regenerated adsorbent particles. In one embodiment, the second connector is further configured to isolate pressure in said second connector from pressure in said first system. In one embodiment, the second connector is further configured to maintain a pressure at the exit of the second system.

As described herein, the second system of the fluid treatment apparatus described herein regenerates adsorbent particles. In one embodiment, the second system is a regeneration system. In one embodiment, the second system is a regenerator that includes a mechanism to transport the adsorbent hydraulically or pneumatically or using both a liquid and a gas. In accordance with the embodiments described supra, the second system may include a riser and the riser may include an energy delivery system that regenerates, aids in the regeneration of, or causes the regeneration of the spent adsorbent and/or decomposition of the one or more target compounds. In one embodiment, the energy delivery system is configured to regenerate or cause to regenerate adsorbent particles. In one embodiment, the energy delivery system is configured to activate or cause to activate the adsorbent to destroy said one or more target compounds. In another embodiment, the energy delivery system is configured to decompose (e.g., destroy) or cause to decompose (or destroy) said one or more target compounds.

The second system as described herein may include one or more forms of regeneration including, but not limited to, photocatalytic oxidation, photocatalytic reduction, photolysis, radiation (e.g., x-rays, gamma rays), electrochemical decomposition, chemical decomposition, or ultrasonic decomposition where the one or more target compound is reacted to convert it into less or non-toxic substances.

In one embodiment, the second system includes an energy delivery system, and the energy delivery system may be configured to expose adsorbent particles to radiation. The radiation may, in one embodiment, regenerate, assist in regenerating, or cause to regenerate spent adsorbent. In one embodiment, the radiation is electromagnetic radiation or ultrasonic radiation. Electromagnetic radiation as described herein may include the use of solar-generated photons, the production of electromagnetic radiation via the excitation of electrons to produce, the excitation of mercury atoms and/or through the production of light using a semiconductor as in a light emitting diode.

Photooxidation, which may occur in the second system, is process a that uses a light to activate a semiconductor by elevating an electron from the valence band to the conduction band. The elevated electron then leaves an electron hole. The electron hole in the valence band has the ability to oxidize and degrade or cause the degradation of one or more target compounds directly. Hoffmann et al., "Environmental Applications of Semiconductor Photocatalysis," *Chem. Rev.* 95:69-96 (1995) and Xu et al., "Photocatalytic Removal of Perfluoroalkyl Substances From Water and Wastewater: Mechanism, Kinetics and Controlling Factors," *Chemosphere* 189:717-729 (2017), both of which are hereby incorporated by reference in their entirety. When the electron hole $h^+$ reacts with or oxidizes water, the result is a hydrogen ion ($H^+$) and a hydroxyl radical. However, the C—F bond is not degraded by this radical. Therefore, the production of hydroxyl radicals is not efficient for the degradation of PFOA or other PFAS. Kutsuna et al., "$TiO_2$-Induced Heterogeneous Photodegradation of a Fluorotelomer Alcohol in Air," *Environ. Sci. Technol.* 40(21):6824-29 (2006), which is hereby incorporated by reference in its entirety. However, the energized electron that migrates to the surface of the photocatalyst can react with adsorbed water to form hydrated electrons which can react with the one or more target compound thereby degrading or assisting in degrading them or causing them to become degraded. Electron holes can also react with the one or more target compound resulting in degradation processes. More information regarding the reaction of electron holes and hydrated electrons may be found in the work of Xu et al. See Xu et al., "Photocatalytic Removal of Perfluoroalkyl Substances From Water and Wastewater: Mechanism, Kinetics and Controlling Factors," *Chemosphere* 189:717-729 (2017), which is hereby incorporated by reference in its entirety.

Photodegradation, which may occur in the second system, may occur with the one or more target compound(s) adsorbed onto the surface of an adsorbent particle. In one embodiment, the adsorbent may be a material that is a combination of an adsorbent (e.g., beta zeolite) and a photocatalyst such as titanium dioxide ($TiO_2$) or indium oxide ($In_2O_3$). Selective removal of compounds such as perfluorinated contaminants by adsorption on all-silica zeolite beta is described in Corma et al., "Zeolite-Based Photocatalysts," *Chemical Communications* (13):1443-1459 (2004), which is hereby incorporated by reference in its entirety. The compartmentalized intracrystalline void space of zeolites are especially suited to incorporate and organize photoactive guests that can be used as photocatalysts. Zeolites as hosts are particularly attractive to construct organic photocatalysts since the guest becomes significantly stabilized by incorporation. Photocatalytic oxidation and decomposition of acetic acid on titanium silicate is described in Lee et al., "Photocatalytic Oxidation and Decomposition of Acetic Acid on Titanium Silicalite," *Environmental Science & Technology* 35(6):1252-1258 (2001), which is hereby incorporated by reference in its entirety. One step in removing one or more target compounds (e.g., PFAS) from a fluid is by adsorbing it onto an appropriate adsorbent such as beta zeolite which has a high affinity for hydrophobic materials. Van den Bergh et al., "Highly Selective Removal of Perfluorinated Contaminants by Adsorption on All-Silica Zeolite Beta," *Angewandte Chemie International Edition* 59(33):14086-14090 (2020), which is hereby incorporated by reference in its entirety.

Photoreduction of one or more target compounds, which may occur in the second system, occurs through the reaction of hydrated electrons with adsorbed target compound(s) resulting in cleaving of the carbon chain into shorter chain compounds. Xu et al., "Photocatalytic Removal of Perfluoroalkyl Substances From Water and Wastewater: Mechanism, Kinetics and Controlling Factors," *Chemosphere* 189: 717-729 (2017) and Zhao, B., "Photocatalytic Decomposition of Perfluorooctanoic Acid with β-ga 2o 3 Wide Bandgap Photocatalyst," *Catalysis Communications—CATAL. COMMUN.* 10:1184-1187 (2009), both of which are hereby incorporated by reference in their entirety. In one embodiment, photoreduction processes are used for regenerating the adsorbent in the regenerator.

Ionizing radiation such as x-rays, gamma rays, and vacuum UV photons can be used to degrade one or more target compounds in the second system. See Trojanowicz et al., "Application of Ionizing Radiation in Decomposition of Perfluorooctanoate (PFOA) in Waters," *Chemical Engineering Journal* 357:698-714 (2019), which is hereby incorporated by reference in its entirety.

Photolysis has been shown to be used to degrade a target compound PFOA (Chen et al., "Photodegradation of Perfluorooctanoic acid by 185 nm Vacuum Ultraviolet Light," *J. Environ. Sci.* (*China*) 19(4):387-390 (2007), which is hereby incorporated by reference in its entirety) using vacuum UV light ($\lambda$=185 nm). This process has relatively slow reaction kinetics and requires short water columns through which the light travels because water absorbs the relevant wavelengths. However, this method can possibly be used in the regenerator as the depth of water between the riser wall and the centerline of the pipe is small.

The second system may use energy delivery that produces a wavelength between about 10 nm and about 700 nm. In one embodiment, the energy delivery system is ultraviolet light. In one embodiment, the wavelength delivered by the energy delivery system is about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 185 nm about 190 nm, about 200 nm, about 225 nm, about 250 nm, about 275 nm, about 300 nm, about 325 nm, about 350 nm, about 375 nm, about 400 nm, about 425 nm, about 450 nm, about 475 nm, about 500 nm, about 525 nm, about 550 nm, about 575 nm, about 600 nm, about 625 nm, about 650 nm, about 675 nm, about 700 nm, or any wavelength therebetween. In one example, the adsorbent particles are exposed to 185 nm light to photolytically degrade the one or more target compounds into minerals such as carbon dioxide, water, and fluoride ions. In one example, a fluid (e.g., water) absorbs 185 nm light, therefore, using an adsorbent may allow the light path between the energy delivery system and the adsorbent particles to be of a short length. The amount and strength of output by the energy delivery system may determine the amount to which the one or more target compounds are degraded. The second system may optionally include a light source.

The second system of the fluid treatment apparatus described herein may further include other or additional compounds, and those compounds may assist in promoting or assisting regeneration or causing to be regenerated of one or more spent adsorbent particles. In one embodiment, the second system further includes one or more photocatalysts, semiconductors, catalysts, adsorbents, metal oxides, or any combination thereof. The second system may include reactants, for example, hydroxide ions, hydrogen ions, oxygen, ozone, or other substances. In one embodiment, a photocatalytic adsorbent or adsorbent is used in the apparatus, systems, and methods described herein. The spent photocatalytic adsorbent or adsorbent may be exposed to oxidizing or reducing species when exposed to an energy delivery system (e.g., one which produces ultraviolet light, electrochemical potential, or electrical potential) which may provide a means to decompose one or more target compounds. Measurements for examples including photocatalysts may be completed using the wavelengths described herein. In one embodiment, the wavelength administered in the presence of a photocatalyst may be between 200 nm and 400 nm.

The first system and second system of the fluid treatment apparatus described herein are decoupled. The term decoupled as described herein includes when the first system and the second system run processes that operate simultaneously, but in different locations, all while providing boundary conditions for one another. The process in the first system and the process in the second system are decoupled. The term decoupled as described herein also includes the fluid mechanical decoupling of the first and second system. The control system allows the dynamic pressure drop across the riser to be independently specified from the dynamic pressure drop across the moving packed bed adsorber. This allows the particle phase velocity and the solids fraction in the second system to be independently specified for process optimization. For example, the removing of one or more targeted compounds in the first system and regenerating the adsorbent particles in the second system may be carried out simultaneously but separate from one another. Decoupling allows process resources to be allocated to the system that limits the effectiveness of the entire process. Thus, the first system and the second system carry out two different processes in separate sections of equipment, and those processes are operated independently. The effluent of one process in one section provides the starting point for the other process in the other section, thereby producing a fluid treatment apparatus with a first system and a second system that are decoupled, but provide boundary conditions for the other. In one embodiment, a stripping process and a regeneration process are decoupled. The decoupling of the first system and the second system as described herein allow for flexibility in reactor design and further allows for independent optimization of each separate process in each separate system in a capacity limiting manner. The decoupling of the first system and the second system, in one embodiment, allows for resources to be allocated to the portion of the reactor system that is process limiting.

In one embodiment, one or more conditions of the first system are adapted for adjustment independently of the second system. In another embodiment, one or more conditions of the second system are adapted for adjustment independently of the first system. For example, a fluid flow rate through the first system can be varied independently of the dynamic pressure drop across and the fluid flow rate through the second system. Likewise, the residence time of the particles in the regenerator can be determined independently of the solids mass flow rate ($G_p$) to allow additional time for regeneration to occur. Likewise, the solids fraction in the second system can be varied independently from the conditions in the first system. The particle velocity is important as it may determine the particle residence time in the second system for a given system configuration. The solids fraction or particle concentration may determine the rate at which the photons are able to reach the solids on the interior of the conduit in the second system. The solids fraction can be determined independently of the solids mass flow rate to allow the radiation intensity on the solids to be optimized.

The fluid treatment apparatus as described herein may, in one embodiment, include one or more of the first system. In another embodiment, the fluid treatment apparatus may include one or more of the second system. In yet another embodiment, the fluid treatment apparatus may include more than one first system and more than one second system.

Figure 7:
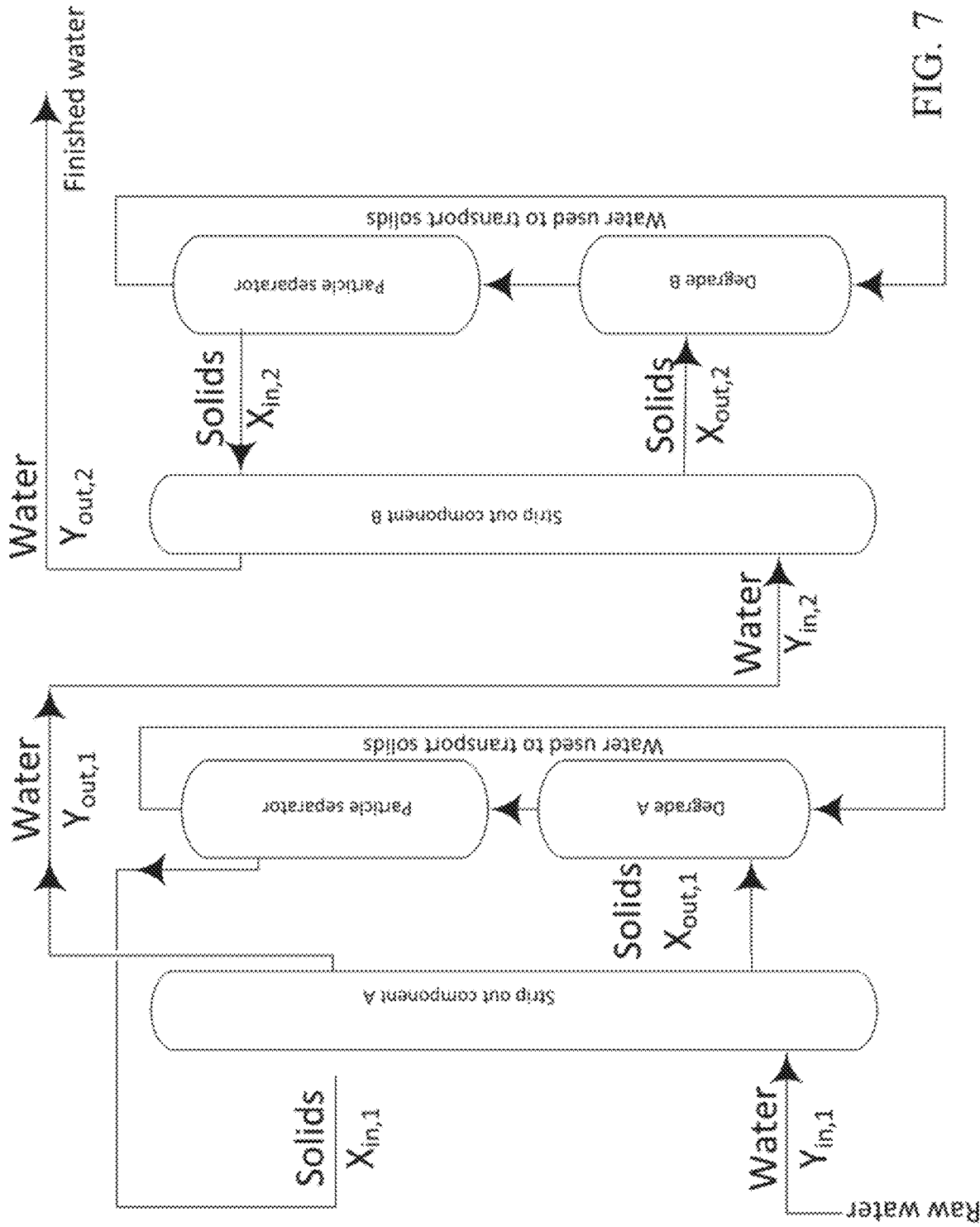
FIG. 7 shows a schematic of how two different compounds that are do not adsorb onto the same adsorbent can be targeted by placement of two full systems in series.

One embodiment of the apparatus, system, and methods described herein is depicted in FIG. 7. In particular, FIG. 7 illustrates an embodiment where there is more than one process run in series so there is more than one first system and more than one second system to allow multiple target compounds to be stripped from the fluid and to allow more than one regeneration method to be run. In certain embodiments, there may be more than one first system and one second system. In other embodiments, there may be more than one second system and one first system. In other embodiments, there may be more than one first system and more than one second system.

As shown and described in FIG. 1, the target compound destruction process includes a two-step process, where the two steps are run concurrently and continuously. The first step includes a stripping system (e.g., PFAS stripping system) (interchangeably referred to herein as a "first system"). A fluid containing one or more target compounds (e.g., water and PFAS) enters into the stripping system. The target compound is stripped from the fluid (e.g., the PFAS is stripped from the water) using an adsorbent with an affinity for the target compound. After stripping the target compound from the fluid, the adsorbent particles are conveyed to a photocatalytic adsorbent regenerator through a connector (interchangeably referred to herein as a "first connector"). The second step then includes regenerating the adsorbent using a method that is kinetically favorable and produces substances that are innocuous to the environment (interchangeably referred to herein as a "second system"). After regenerating the adsorbent, the adsorbent particles pass through a fluid-particle separator (interchangeably referred to herein as a "second connector") and may re-enter the stripping system in step 1 for reuse after which time the adsorbent particles may undergo the same process one or more times. The treated fluid (e.g., water) may exit the stripping system.

Figure 2:
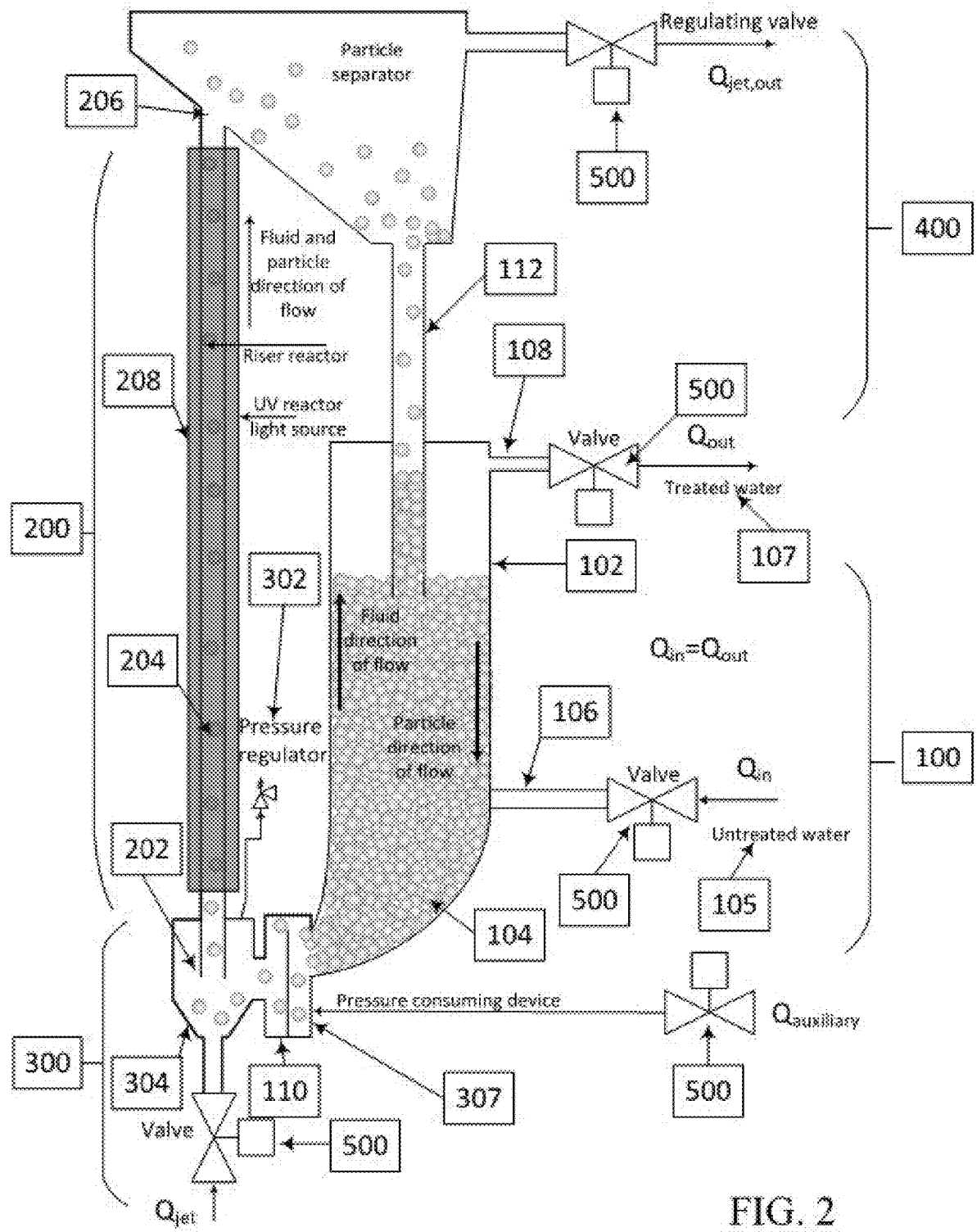
FIG. 2 shows a schematic representation of a PFAS destruction process described herein, in particular, one configuration of process equipment. The fluid mechanical conditions in the riser are controlled by the fluid flow rate there and the dynamic pressure drop across the riser which is defined by the use of the combination of the pressure regulator and the valve at the effluent of the particle separator. The fluid flow rates through the equipment are controlled using valves on the influent and effluent portions of the equipment and the dynamic pressure drop across the riser is maintained using a pressure regulator and fluid effluent valves.
Figure 3:
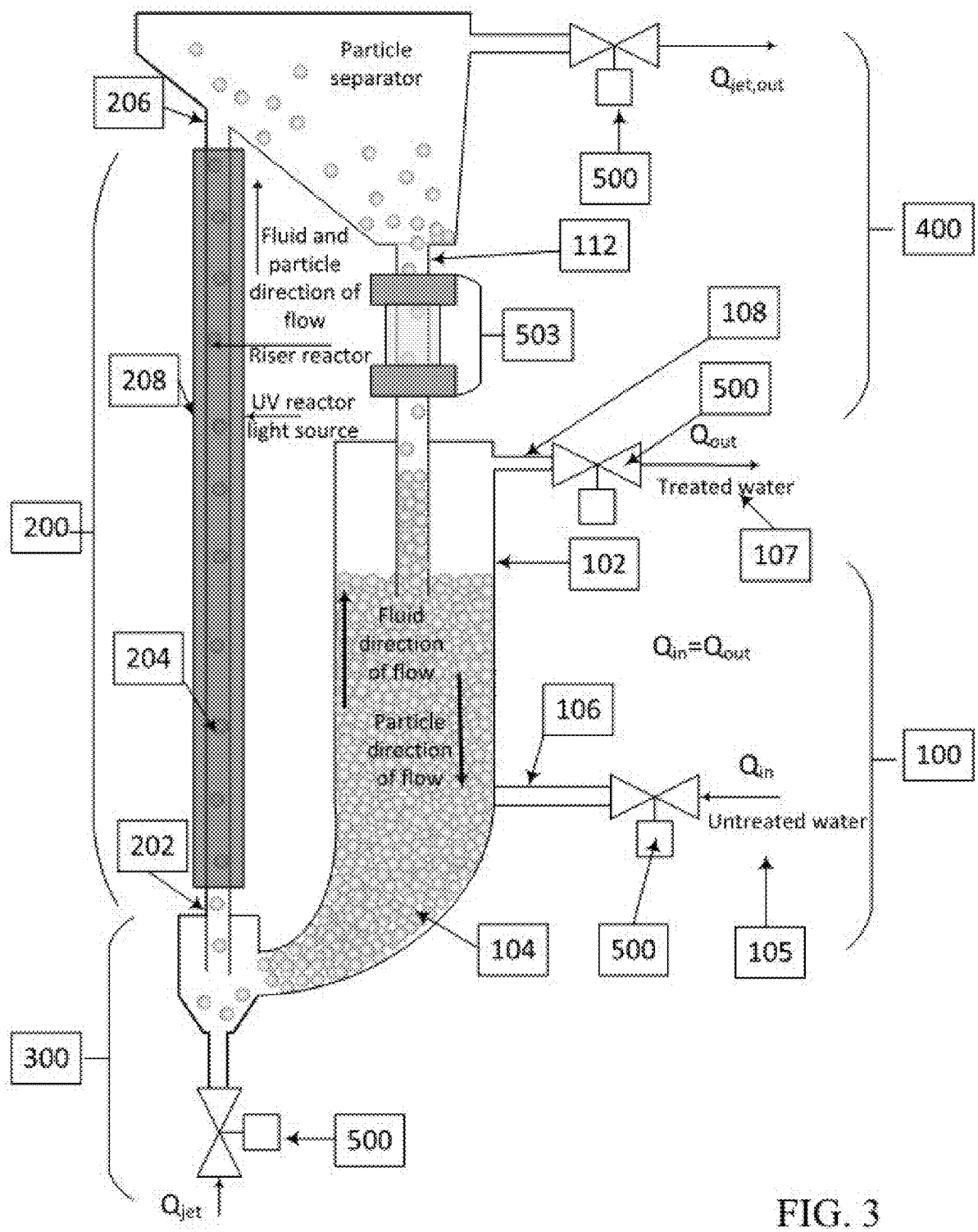
FIG. 3 shows a schematic of one method of decoupling the fluid mechanics in the riser and in the moving packed by using a valve lock system to isolate the pressures in the particle separator and in the moving bed, and the valve at the effluent of the particle separator. This configuration of the process is based on a Type 2 Draft Tube Spout-Fluid Bed. See, e.g., Littman et al., "New Type of Draft Tube Spout-Fluid Bed. Part 1: Hydraulic Transport of 1.94 mm Glass Particles in Water," *Industrial & Engineering Chemistry Research* 48(20):9286-9298 (2009), which is hereby incorporated by reference in its entirety.
Figure 4:
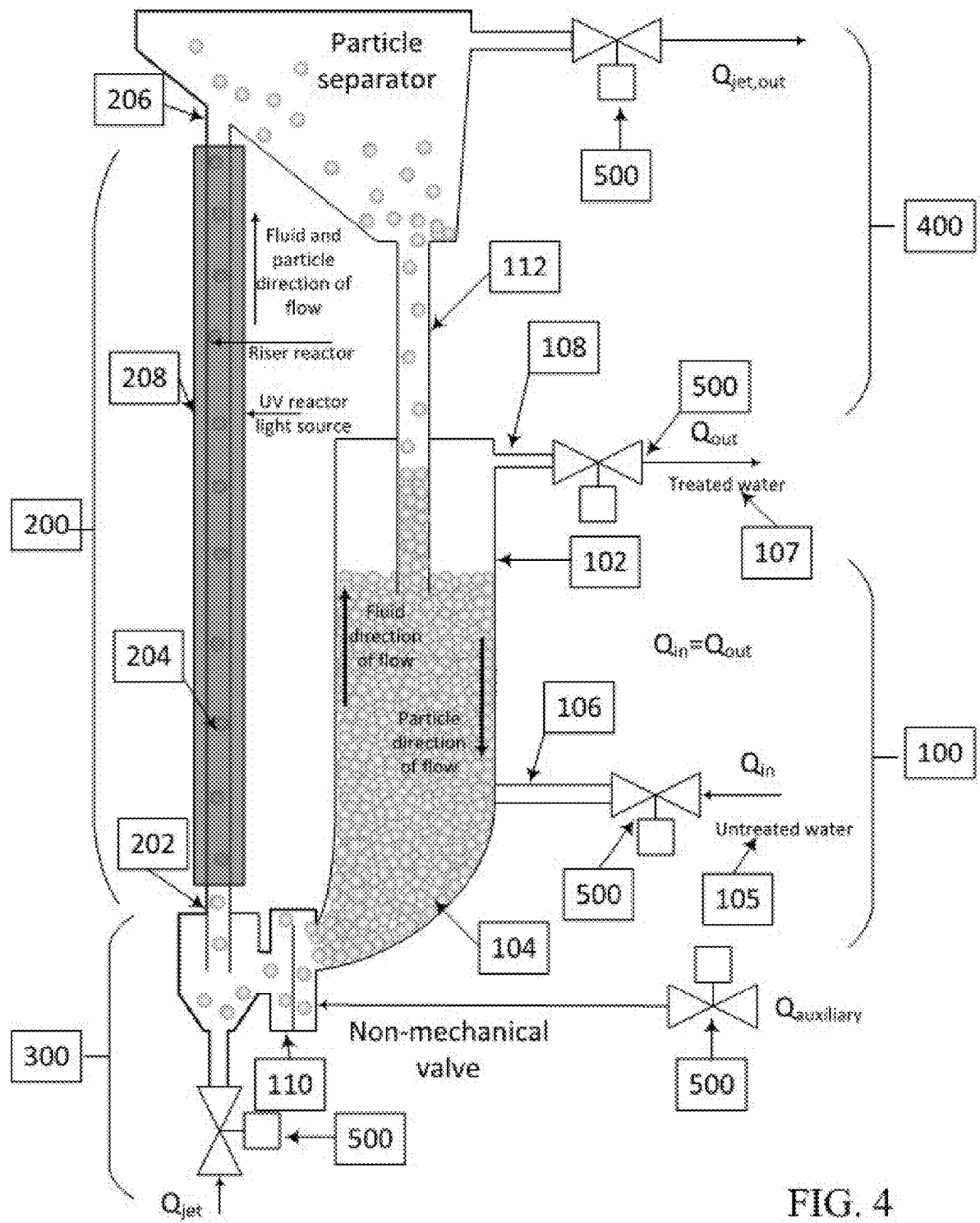
FIG. 4 shows a schematic representation of a PFAS destruction process described herein, in particular, one configuration of process equipment using a liquid-solids circulating fluidized bed (LSCFB).
Figure 5:
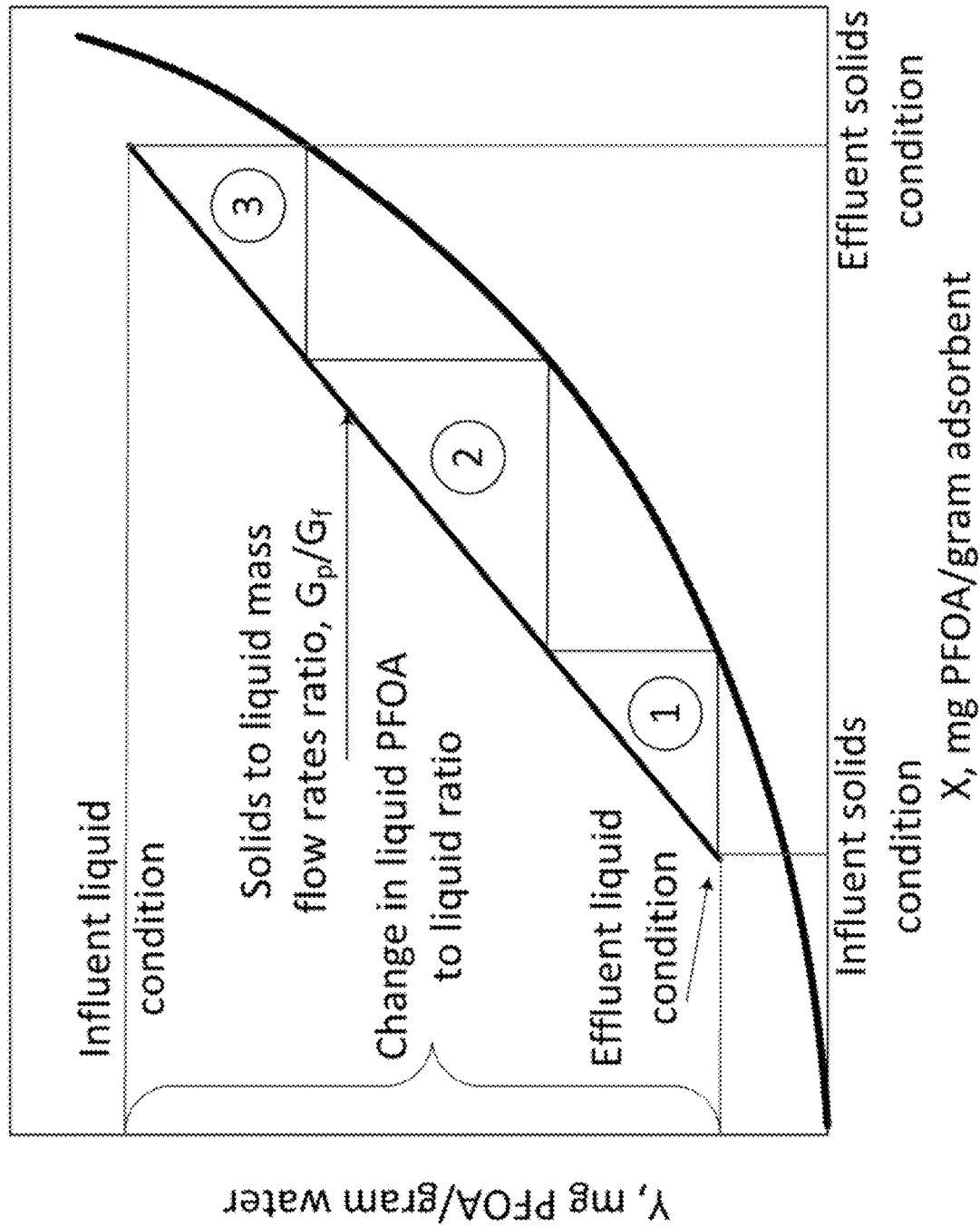
FIG. 5 shows a graphical representation of the target compound stripping/adsorption process. The curve represents the equilibrium concentrations of the target compound in the water and on the adsorbent. The straight line represents the operating line, which is the ratio of the solids to liquid mass flow rates ($G_p/G_{f,b}$).

Embodiments of the apparatus, system, and method described herein are shown in FIGS. 2-4. The first system 100 (also referred to herein as a stripping system) includes vessel 102 which houses adsorbent particles 104. The first system 100 further includes a first fluid inlet 106 whereby untreated fluid 105 enters the first system. First system 100 further includes a first fluid outlet 108 whereby treated fluid 107 exits the first system. First system 100 further includes a first adsorbent outlet 110 whereby adsorbent 104, after adsorbing one or more target compounds and thereby becoming spent adsorbent particles, exits the first system 100. First system 100 further includes a first adsorbent inlet 112 whereby adsorbent 104, after regeneration, re-enters the first system 100. Second system 200 (also referred to herein as a regeneration system) includes a first riser inlet 202 whereby adsorbent 104, after adsorbing one or more target compounds and thereby becoming spent adsorbent particles and after exiting the first system 100 and passing through a first connector 300, enters the second system. The second further includes riser 204 whereby spent adsorbent is passed and regenerated, and a first riser outlet 206 for transporting the regenerated adsorbent 104 to a second connector 400. This embodiment shows a vertical riser 204, but the riser may be any suitable shape or length (e.g., a vertical or serpentine shape with a varying length depending on which variables are sought to be controlled). Second system 200 also includes an energy delivery system 208, which in the embodiment shown in FIG. 2 surrounds riser 204 and provides exposure on all sides of riser 204. Energy delivery system 208 may be configured to regenerate adsorbent particles 104 and may be configured to decompose or destroy the one or more target compounds that are adsorbed on the surface of adsorbent particles 104. The apparatus further includes a first connector 300 which is configured to transfer adsorbent particles from the first system to the second system. The first connector may include a second fluid inlet 304 through which fluid is introduced to convey said spent adsorbent from said first connector into said second system. The first connector may include a pressure regulator 302 (as shown, for example in FIG. 2) to provide a means of regulating the pressure at the entrance to the second system. The first connector may include a fluid source 307 that may be used to assist in the control of pressure and/or solids flow rate in said first connector. The apparatus further includes a second connector 400 which is configured to release adsorbent particles from the second system and, in one embodiment, transport the adsorbent particles back to the first system. Second connector 400 may further be configured to separate out adsorbent particles. There are one or more optional valves 500 to regulate pressure and flow within the apparatus.

One example of a valve lock system 503 is shown in FIG. 3 where the valves may provide a means for isolating the pressure in said first system 100 and said second connector 400. A process control system with flow control valves as shown for example in FIG. 3 may consist of flow and pressure control valves that control the flow rate of fluid provided to the fluid introduction inlet to the said first connector and pressure control valves for controlling the dynamic pressure gradient in the riser. The said riser may be equipped with pressure sensors that may be used to acquire pressure values that are used to compute a dynamic pressure gradient in said riser. A process control system can contain one or more control valves that may be used to specify a flow rate and/or specify a pressure or pressures in the first system, the second system, the first connector, the second connector, or any combination of the first system, second system, first connector, and second connector. The apparatus may further include a non-mechanical valve as described herein and shown in FIG. 4. Said non-mechanical valve may or may not be equipped with an auxiliary flow of fluid to control the solids mass flow rate in the riser. The apparatus can include a non-mechanical or mechanical valve as described herein.

Figure 6:
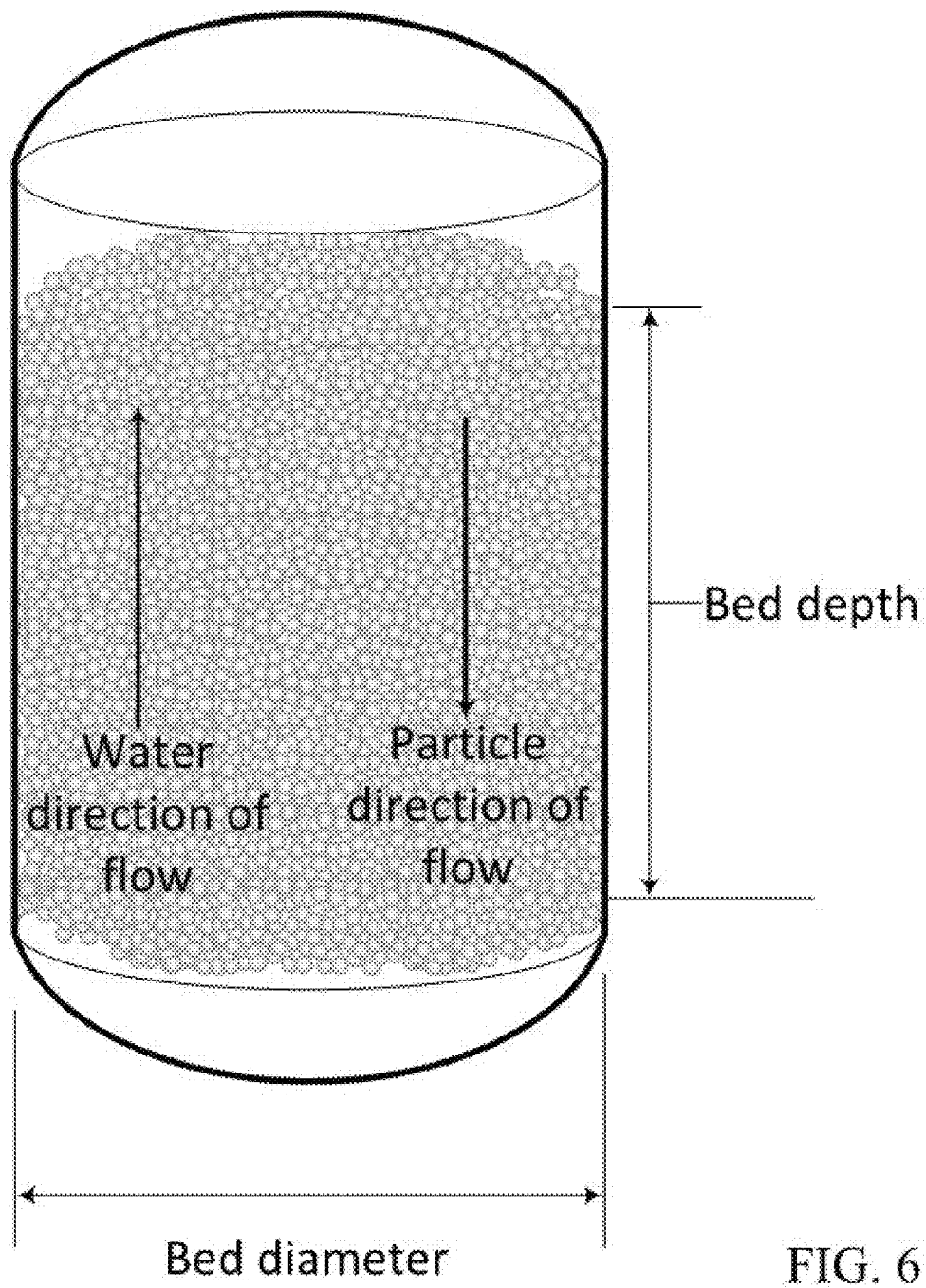
FIG. 6 shows a schematic of the counter-current movement of the fluid and the solid particles.

One embodiment is shown in FIG. 6 which depicts the first system, where the particle direction of flow is opposite the fluid direction of flow, relative to the depth and diameter of the first system.

The first and second systems as described with respect to FIGS. 1-7 may be operated in "batch" or in "continuous" mode. In batch mode, after completion of a treatment "run" where the fluid is treated, the treated fluid may be forwarded for further processing, for example, packaging or storage. In continuous mode, the fluid to be treated may be substantially continuously introduced to the first system, and substantially continuously removed from the first system, then forwarded to further processing in a continuous manner.

The apparatus, systems, and methods described herein may include at least one fluid supply, one or more control and monitoring devices, pressure sensors, a control system that is adapted to control the apparatus and systems described herein based, for example, upon user input, for instance, via user interface, and/or the parameters monitored by the control and monitoring devices. The operation of the apparatus, systems, and methods described herein may be monitored and controlled automatically by said control system. The control system may include a main controlling device and user interface, for example, a keyboard, mouse, or touch screen, as is conventional. A controlling device may be a dedicated personal computer or a dedicated control system, for example, having a data acquisition (DAQ) system, PLC controllers having control algorithms adapted to monitor and control the operation of the system based upon the fluid and other materials being handled and the desired handling and treatment.

A second aspect of the present disclosure relates to a system comprising one or more fluid treatment apparatus described herein.

This aspect is carried out in accordance with the previously described aspect.

A third aspect of the present disclosure relates to a method for treating fluid. The method includes providing fluid comprising one or more target compounds; removing said one or more target compounds from said fluid in a first system comprising adsorbent particles; regenerating said adsorbent particles in a second system; providing a first connector between said first system and said second system, said connector configured to transfer said adsorbent particles from said first system to said second system; and providing a second connector between said first system and said second system, said second connector configured to release of adsorbent particles from said second system, wherein said first system and said second system are decoupled, under conditions effective to treat said fluid.

This aspect is carried out in accordance with the previously described aspects, including the first system, the second system, the first connector, and the second connector.

In one embodiment, the method further includes providing a vessel comprising adsorbent particles. The vessel described herein may comprise multiple sections, for example, an upper or top section comprising and a bottom section. The vessel may be a cylindrical vessel, for example, a circular cylindrical vessel, and may comprise one or more converging sections, for example, having an inverted frustoconical shape. The vessel may also have other appropriate shapes.

In one embodiment, the first system in the method further includes providing said fluid comprising one or more target compounds into said first treatment system via a first fluid inlet; and providing a first fluid outlet positioned for treated fluid to exit said first system.

In one embodiment, the first system in the method further includes providing a first adsorbent outlet positioned for adsorbent particles to exit said first system; and providing a first adsorbent inlet positioned for adsorbent particles to enter said first system.

In another embodiment, the second system in the method further includes accepting adsorbent particles via a first riser inlet; accepting fluid via a second fluid inlet; transporting adsorbent particles via a riser comprising a conduit to transport said adsorbent particles; and transferring adsorbent particles through a first riser outlet to exit said second system.

In one embodiment, the second connector is further configured to separate or cause to be separated the regenerated adsorbent particles. In another embodiment, the second connector is further configured to isolate pressure in said second connector from pressure in said first system.

In one embodiment, the method further includes providing a process control system as described in the previous aspect that includes one or more control valve that is configured to specify a flow rate or a pressure (e.g., a pressure gradient).

In yet another embodiment, the method further includes exposing said adsorbent particles to radiation via an energy delivery system. The energy delivery system is in accordance with the energy delivery system of the previously described aspects.

The target compounds, adsorbent particles, and conditions are in accordance with the previously described aspects.

A fourth aspect of the present disclosure relates to a system comprising the method for treating fluid described herein.

This aspect is carried out in accordance with the previously described aspects.

The present disclosure may be further illustrated by reference to the following examples.

EXAMPLES

The following examples are intended to illustrate, but by no means are intended to limit, the scope of the present disclosure as set forth in the appended claims.

Example 1—Novel Reactor Design

In the present disclosure, the water treatment reactor is referred to as novel. This is because, unlike most other photocatalytic reactor designs, the one described here separates the process into two steps that run concurrently and continuously. The two steps include: (1) stripping of the PFAS from the water using an adsorbent with an affinity for the PFAS, and (2) regeneration of the adsorbent using a method that is kinetically favorable (the amount of time is reasonable) and produces substances that are innocuous to the environment. A schematic of the process is shown in FIG. 1.

The novel reactor design is described which provides for an effective and flexible method of decomposing PFAS in water or AFFF concentrate or other target compounds using photocatalytic oxidation/reduction chemical degradation. The reactor design has the following features: (1) it decouples the adsorption and degradation processes thereby eliminating the problems inherent in slurry and monolith design reactors, (2) The reactor is readily scaled from near bench top size up to what is needed for industrial or municipal capacity, and (3) The reactor can utilize advances in adsorbent/photocatalyst technology without the need to rebuild the reactor itself. This process involves removing the photocatalytic adsorbent material and replacing it with fresh material.

The degradation process occurs in two steps. The first step removes the PFAS from the AFFF or other target compounds from solution or another fluid by adsorbing it onto an appropriate adsorbent such as beta zeolite which has a high affinity for hydrophobic materials. Van den Bergh et al., "Highly Selective Removal of Perfluorinated Contaminants by Adsorption on All-Silica Zeolite Beta," *Angewandte Chemie International Edition* 59(33):14086-14090 (2020), which is hereby incorporated by reference in its entirety. The second step of the process regenerates the photocatalytic adsorbent material by exposing it to UV light which produces reactive species or conditions which decompose or cause to decompose the PFAS/target compound(s). Once regenerated, the process conveys the solids back to the adsorber (or stripping unit) in a continuous manner. The stripping and regeneration processes are continuous in function and therefore can be operated with either small or large batches of AFFF concentrate, water or wastewater. The stripping unit can be scaled in both diameter and height to accommodate incoming flow rates of fluid and PFAS/target compound concentration.

FIG. 2 shows one potential configuration of the process equipment. The process equipment consists of the following items. The description begins with the counter-current moving bed and progresses clockwise: (1) a counter-current moving bed where the water is stripped of a target compound (stripping unit); (2) a section to convey the solids from the bed to the riser inlet; (3) a pressure consuming and/or setting device that may or may not be equipped with an additional stream of fluid; (4) a riser inlet which contains a fluid inlet section and a solids inlet section; (5) a concurrent flow riser where the solids are transported vertically and the particles are regenerated (regenerator); (6) a particle separator where the solids are allowed to settle out; and (7) a downcomer where the solids are conveyed back to the top of the moving bed. Nomenclature referenced herein is described in Table 2.

FIG. 3 shows one potential configuration of the process equipment. The process equipment consists of the following items. The description begins with the counter-current moving bed and progresses clockwise: (1) a counter-current moving bed where the water is stripped of a target compound (stripping unit); (2) a section to convey the solids from the bed to the riser inlet; (3) a riser inlet which contains a fluid inlet section and a particle inlet section; (4) a concurrent flow riser where the solids are transported vertically and the particles are regenerated (regenerator); (5) a particle separator where the solids are allowed to separate from the fluid; (6) a pressure regulating valve downstream of the fluid-particle separator to specify the pressure in the second connector; and (7) a downcomer that contains a valve-lock system through which the solids are conveyed back to the top of the moving bed. Nomenclature referenced herein is described in Table 2.

FIG. 4 shows one potential configuration of the process equipment. The process equipment consists of the following items. The description begins with the counter-current moving bed and progresses clockwise: (1) a counter-current moving bed where the water is stripped of a target compound (stripping unit); (2) a section to convey the solids from the bed to the riser inlet; (3) a non-mechanical valve that is used to set the solids mass flow rate; (4) a riser inlet which contains a fluid inlet section and a particle inlet section; (5) a concurrent flow riser where the solids are transported vertically and the particles are regenerated (regenerator); (6) a particle separator where the solids are allowed to settle out; (7) a fluid outlet downstream of the fluid-particle separator; and (8) a downcomer that may or may not contain an elevated standpipe system. Nomenclature referenced herein is described in Table 2.

TABLE 2

Nomenclature

| | |
|---|---|
| $\epsilon_r$ | Voidage in the riser |
| $D_b$ | Moving packed bed diameter L |
| $G_p$ | Solids mass flow rate in the reactor, $MT^{-1}$ |
| $G_{f,b}$ | Water mass flow rate in the moving bed, $MT^{-1}$ |
| $G_p$ | Solids circulation rate in the treatment system $MT^{-1}$ |
| $H_b$ | Moving packed bed depth, L |
| $v_r$ | Particle phase velocity, $LT^{-1}$ |
| $X_{in}$ | Mass ratio of target compound to dry adsorbent entering the top of the moving bed, $MM^{-1}$ |
| $X_{out}$ | Mass ratio of target compound to dry adsorbent exiting the bottom of the moving bed, $MM^{-1}$ |
| $Y_{in}$ | Mass ratio of target compound to water entering the bottom of the moving bed, $MM^{-1}$ |
| $Y_{out}$ | Mass ratio of target compound to water exiting the top of the moving bed, $MM^{-1}$ |
| $(1-\epsilon_r)$ | Solids fraction in the riser |
| PRCR | Pressure-regulated circulating riser |
| DTSFB | Draft tube spout fluid bed |
| LSCFB | Liquid solid circulating fluidized |

Example 2—Decoupling Process Scheme and Attributes

The adsorption and regeneration sections are separate and therefore run in different sections of the equipment. This is important because it reduces the entire process to two readily modeled and optimizable operations because it decouples the stripping and regeneration operations. What makes this important is how the processes operate. First, how this process operates will be examined if both adsorption (stripping) and regeneration occur in the same vessel. For this discussion, the assumption is that the regeneration process occurs by the photocatalytic oxidation of the target compounds that have been adsorbed onto the solid particles.

When both the adsorption and regeneration processes are in a single vessel, the target compound(s) must first be adsorbed by the solid particle and then, when photons activate the photocatalyst, the oxidizing or reducing species attack and destroy the target compound(s). This represents two subsequent processes, adsorption and regeneration. If the decomposition kinetics are slow, then further adsorption will not occur and the water will not be able to be discharged until the decomposition process regenerates enough adsorption sites on the solids to advance the stripping process. To remedy this, one could enhance the regeneration process by adding additional illumination sources which increases the photon flux and therefore may possibly increase the rate of electron hole generation. This also adds illumination to the locations that are distant from the light sources. However, there is an upper limit to which the rate of photon addition can be increased for a given equipment design because the lights will occupy the internal space of the reactor. Additional photocatalytic/adsorbent can also be added to the water to improve adsorbent capacity, but this limits the path of the regenerating photons and reduces the intensity of light available for photocatalytic regeneration. The addition of more adsorbent/photocatalytic particles to the water improves the mass transfer surface area and adsorbent capacity, but it detrimentally affects the light path and therefore, the ability to regenerate the adsorbent. Increasing the number of light sources inside the reactor improves the photon flux in the reactor, but it reduces the available volume for water and photocatalyst. Thus, running both adsorption and regeneration in the same vessel makes it difficult to determine which of the processes, adsorption or regeneration, is limiting and to augment the limiting process by adding resources to the process that is limiting the throughput.

This reactor design can be made more flexible by decoupling the adsorption/stripping and regeneration processes. By decoupling the adsorption/stripping and regeneration processes, the target compound is first isolated and concentrated onto and adsorbent. The adsorbent is then transported (conveyed) to a regenerator where the conditions are optimized specifically for the regeneration process. In this case, if the decomposition kinetics are too slow, additional length may be added to the regenerator to leave more available decomposition sites for adsorbing the target compound from the water. Also, additional light may be added to the regenerator if necessary and it does not take up any space in the striping unit. Running the adsorption/stripping process in the moving bed and regeneration in the riser allows these two processes to be optimized independently.

There are several process attributes. First, the equipment has similarities to a liquid-solids circulating fluidized bed, and in some circumstances the process can be run in such a piece of equipment. However, this type of equipment is more difficult to optimize. Second, the counter current moving bed is the location where water is processed to remove the PFAS/target compound(s). This is modeled and operated as any other liquid-solids counter-current moving bed stripping unit. This is designed to perform the stripping process only which allows the conditions there to be optimized for this operation. Third, the solids leaving the stripping bed are then conveyed (continuously) to the regenerator. The regenerator is designed to operate with a very low residence time distribution ($\sigma^2$) to approximate a plug flow reactor (PFR) to make the process efficient and therefore as small as physically possible. For this reason, the riser is designed to run the PFAS/target compound(s) decomposition. Fourth, the stripping and decomposition operations are run in different portions of the reactor and are therefore decoupled to the extent possible. This allows resources to be allocated to the portion of the reactor system that is the slowest. Fifth, the two processes (decomposition and stripping) share boundary conditions. Sixth, the riser portion of the reactor system has the ability to be controlled to independently specify the particle velocity ($v_r$) and the solids fraction ($1-\epsilon_r$) independently. This is important because optimization of the riser conditions requires both particle phase velocity and solids fraction to be independently specified. For a given piece of equipment, the particle phase velocity determines the mean residence time in the riser and the solids fraction determines the average light intensity on the particles, which drives the regeneration process. The independent control of the particle phase velocity and the solids fraction can be performed in either a Type 2 draft tube spout fluid bed or in a pressure-regulated circulating riser system.

Example 3—Fluid-Particle Contact System

The PFAS water treatment process is run in a fluid-particle contact system that is similar to a liquid-solids circulating fluidized bed (LSCFB) in that both devices have a moving bed, a riser, a particle separator, and possibly a non-mechanical valve (one configuration uses a non-mechanical valve). The system shown in FIG. 2 shows a piece of equipment that is similar to a LSCFB, but is a called a pressure-regulated circulating riser (PRCR) and allows for continuous operation of the system and providing a means for simultaneously determining both the liquid flow rate through and the dynamic pressure gradient across the riser. FIG. 3 shows a piece of equipment that is similar in concept to a Type 2 draft tube spout-fluid bed (Type 2 DTSFB) that was described by Littman. See Littman et al., "New Type of Draft Tube Spout-Fluid Bed. Part 1: Hydraulic Transport of 1.94 mm Glass Particles in Water," *Industrial & Engineering Chemistry Research* 48(20):9286-9298 (2009), which is hereby incorporated by reference in its entirety.

Both the PRCR and the Type 2 DTSFB have the ability to independently control both the solids fraction ($1-\epsilon_r$) and the particle phase velocity ($v_r$) in the riser. The method of controlling these two quantities in a Type 2 DTSFB is due to the way the dynamic pressure drop across the riser is controlled by the valve at the effluent of the particle separator. The method of controlling these two quantities in a PRCR is due to the way the dynamic pressure drop across the riser is controlled using a pressure regulator at the riser inlet and the valve at the effluent of the particle separator. The fluid flow rate in the riser ($G_{f,r}$) in a LSCFB, PRCR and Type 2 DTSFB is determined by the fluid control valving. However, the Type 2 DTSFB requires a valve-lock system to be located between the particle separator and the vessel in which the moving bed resides. This valve-lock isolates the dynamic pressure drop across the riser from that across the moving bed. However, the system in FIG. 2 or FIG. 3 is a proposed plan for controlling the both the solids fraction ($1-\epsilon_r$) and the particle phase velocity ($v_r$) in the riser by using a pressure regulation system directly upstream of the riser inlet and downstream of the particle separator. The operation of the counter-current moving bed is designed and operated, along with the regenerator so that the effluent water at the top of the moving bed meets the treatment specification of the water.

Example 4—Stripping Unit

The stripping unit is based on a counter-current moving (packed) bed where the solids are not fluidized, although theoretically they can be either fluidized or sedimenting, where the water is stripped of the target compound(s) such as PFOA, PFOS (or any PFAS), 1,4 dioxane, or any other unwanted compound. The solid particles consist of a material that has an affinity for the target compound(s). For PFAS, this can be a beta zeolite (silicalite, an all-silica zeolite) or any other adsorbent which has an affinity for hydrophobic compounds. The water entering the bottom of the counter-current moving bed contains the target compound. As the water moves upward through the interstices of the packed bed, the target compound(s) is adsorbed to the solid particles and thereby removed from the stream of water. The effluent water at the top of the moving bed must meet the treatment specification for the treated water.

The ratio of solids to water mass flow rates $G_p/G_{f,b}$ is determined by the desired change in the concentrations of the target compound(s) in the water and on the kinetics of the decomposition process so that that $$\frac{G_p}{G_{f,b}} = \frac{(Y_{in} - Y_{out})}{(X_{out} - X_{in})} \qquad (1)$$

The lower left point of the operating line (FIG. 5) represents the conditions at the top of the moving bed. The upper right point of the operating line represents the conditions at the bottom of the moving bed. The process variables that determine the operating line and the adsorption/stripping process include: (1) bed diameter, $D_b$; (2) bed depth, $H_b$; (3) raw water flow rate, $G_{f,b}$; (4) solids mass flow rate (which is the same as in the riser), $G_p$; (5) the degree to which the photocatalytic adsorbent is regenerated in the regenerator.

An important function of the adsorption section of the process is to remove the target compound(s) from the water to isolate it onto the photocatalytic adsorbent. This allows the photocatalytic adsorbent to be transported to the regenerator where the process conditions can be optimized for target compound decomposition. This also allows the destruction process to proceed without the interference of other compounds that may be acceptable in the water but would possibly interfere with the destruction process. An example of a process diagram is shown in FIG. 1.

Stripping/Adsorption of PFAS/Target Compound—The stripping process is run using a counter-current liquid-solids extraction where the concentrations of the influent and effluent fluids are specified. The stripping process is defined by an operating line, which is defined in part by the ratio of the solids to liquid mass flow rate ratio ($G_p/G_{f,b}$). The placement of the operating line is determined by the concentration of the PFAS/target compound in the incoming liquid, the desired concentration in the effluent liquid, and the concentrations of PFAS/target compound on the solid adsorbent entering and leaving the regenerator (there are four variables that must be specified).

Example 5—Regenerator

The regenerator consists of a conduit through which the particles are transported hydraulically in concurrent fashion as shown schematically in FIG. 1, FIG. 2, FIG. 3, and FIG. 4. The conduit has the ability to transmit energy to decompose or cause to decompose a target compound(s) adsorbed on the photocatalytic adsorbent. The method used for regeneration can take several different forms including: photocatalytic oxidation; photocatalytic reduction; photolysis through exposure to radiation (x-rays, gamma rays, etc.); electrochemical destruction; chemical reaction; and ultrasonic destruction where the PFAS or other target compound is reacted to convert it into less or non-toxic substances. The destruction methods that are most likely to be used in a riser system will be discussed below.

Photooxidation—Photooxidation is a process that uses electromagnetic radiation to activate a semiconductor by elevating an electron from the valence band to the conduction band. The elevated electron then leaves an electron hole. An electron hole in the valence band has the ability to oxidize and degrade PFAS directly. Hoffmann et al., "Environmental Applications of Semiconductor Photocatalysis," Chem. Rev. 95:69-96 (1995) and Xu et al., "Photocatalytic Removal of Perfluoroalkyl Substances From Water and Wastewater: Mechanism, Kinetics and Controlling Factors," Chemosphere 189:717-729 (2017), both of which are hereby incorporated by reference in their entirety. When the electron hole h+ reacts with water, the result is a hydrogen ion (H+) and a hydroxyl radical (·OH). However, the C—F bond is not degraded by this radical. Therefore, the production of hydroxyl radicals is not efficient for the degradation of PFOA or other PFAS. Kutsuna et al., "$TiO_2$-Induced Heterogeneous Photodegradation of a Fluorotelomer Alcohol in Air," Environ. Sci. Technol. 40(21):6824-29 (2006), which is hereby incorporated by reference in its entirety. However, the energized electron that migrates to the surface of the photocatalyst can react with adsorbed water to form hydrated electrons which can chemically reduce PFAS thereby degrading them. Electron holes can also react with PFAS directly resulting in degradation processes. More information regarding the reaction of electron holes and hydrated electrons may be found in the work of Xu et al. See Xu et al., "Photocatalytic Removal of Perfluoroalkyl Substances From Water and Wastewater: Mechanism, Kinetics and Controlling Factors," Chemosphere 189:717-729 (2017), which is hereby incorporated by reference in its entirety.

The photodegradation process occurs with the target compound(s) adsorbed onto the surface of the photocatalytic adsorbent. For this reason, the photocatalytic adsorbent may be a material that is a combination of an adsorbent (e.g., beta zeolite) and a photocatalyst such as titanium dioxide ($TiO_2$), zinc oxide (ZnO), or indium oxide ($In_2O_3$). The photocatalytic adsorbent may also be a zeolite or other adsorbent material that has been engineered to possess photocatalytic properties.

Photoreduction—Photoreduction of PFAS occurs through the reaction of hydrated electrons with adsorbed PFAS/target compound(s) resulting in cleaving of the carbon chain into shorter chain compounds. Xu et al., "Photocatalytic Removal of Perfluoroalkyl Substances From Water and Wastewater: Mechanism, Kinetics and Controlling Factors," Chemosphere 189:717-729 (2017) and Zhao, B., "Photocatalytic Decomposition of Perfluorooctanoic Acid with β-ga 2o 3 Wide Bandgap Photocatalyst," Catalysis Communications—CATAL. COMMUN. 10:1184-1187 (2009), both of which are hereby incorporated by reference in their entirety. Photoreduction processes are an option for regenerating the adsorbent in the regenerator.

Ionizing Radiation—Ionizing radiation such as x-rays and γ-rays can be used to degrade PFAS compounds. Trojanowicz et al., "Application of Ionizing Radiation in Decomposition of Perfluorooctanoate (PFOA) in Waters," Chemical Engineering Journal 357:698-714 (2019), which is hereby incorporated by reference in its entirety.

Photolysis—Photolysis has been shown to be used to degrade PFOA (Chen et al., "Photodegradation of Perfluorooctanoic acid by 185 nm Vacuum Ultraviolet Light," J. Environ. Sci. (China) 19(4):387-390 (2007), which is hereby incorporated by reference in its entirety) using vacuum UV light (λ=185 nm). This process has relatively slow decomposition kinetics and has a problem of requiring short water columns through which the light travels because water absorbs that wavelength. However, this method can possibly be used in the regenerator as the depth of water between the riser wall and the centerline of the pipe is small.

Photocatalytic Adsorbent Regenerator—The photocatalytic adsorbent regenerator is the portion of the reactor where the PFAS/target compound is decomposed thereby allowing the adsorbent to be recycled and reused. The change in mass concentration of PFAS/target compound on the adsorbent between the inlet to, and the effluent from, the regenerator is determined by the decomposition kinetics and the residence time of the adsorbent particles in the regenerator. The regeneration section of the reactor can use several methods to decompose the PFAS/target compound and therefore regenerate the adsorbent. The method described herein utilizes photocatalytic degradation which is expected to follow pseudo-first order kinetics where the pseudo-first order rate constant ($k'_{pseudo-first-order}$) is specific for each photocatalytic/adsorbent material and PFAS/target compound combination, water chemistry (e.g., pH) and the regenerating light intensity, $I_{UV}$. The regenerator design utilizes a near-plug flow reactor (PFR) configuration which ensures the mixing of recently arrived photocatalytic adsorbent (which is laden with PFAS/target compound) is not mixed with the solids that have already undergone treatment to regenerate the adsorptive capacity of the solids. This allows the regenerator to be of a minimum size as compared to configurations where there is mixing of the adsorbent in an illumination chamber. If the decomposition of the PFAS/target compound is determined only by the intensity of the activating energy (light), the degradation kinetics can be modeled using first order expression shown in equation 2.

$$-r'_{PFAS} = -\frac{1}{W}\frac{dM_{PFAS}}{dt} = k'_{overall}\left(\frac{M_{PFAS}}{W}\right) = k'_p(x_{PFOA}) \quad (2)$$

where $X_{PFOA}$ represents the concentration (w/w) of the PFOA on the solid adsorbent. The value of $k'_p$ is a process parameter that must be measured because most literature values are derived from the photocatalytic adsorbent placed in water laden with PFOA and the concentration in the water is measured with respect to time. However, this is not what occurs in the regenerator design described here because when the photocatalytic adsorbent arrives at the generator, the PFAS/target compound is already on the photocatalytic adsorbent and the reaction occurs on the surface alone. For a given set of process conditions, the degradation rate or remaining concentration at the end of the regenerator will be based on the exposure time so that $$\frac{x_{in}}{x_{out}} = \frac{x_{PFAS}}{x_{PFAS,0}} = \exp(-k'_p \bar{t}) = \exp\left(-k'_p \frac{L_{reactor}}{v_r}\right) \quad (3)$$

where $\bar{t}$ is the exposure time inside the reactor where $\bar{t}=L_{reactor}/v_r$ and $L_{reactor}$ is the length of the reactor, $x_{out}$ is the concentration of the PFAS/target compound on the photocatalytic adsorbent exiting the stripping unit, $x_{in}$ is the concentration of the PFAS/target compound on the photocatalytic adsorbent entering the stripping unit from the regenerator, and $v_r$ is the photocatalytic adsorbent particle phase velocity. The particle phase velocity ($v_r$) is determined by the fluid-mechanical conditions in the regenerator, specifically the liquid velocity ($U_r$) and the dynamic pressure gradient ($P'_r$) in the regenerator. Littman et al., "New Type of Draft Tube Spout-Fluid Bed. Part 1: Hydraulic Transport of 1.94 mm Glass Particles in Water," *Industrial & Engineering Chemistry Research* 48(20):9286-9298 (2009), which is hereby incorporated by reference in its entirety. An important feature of separating the regeneration and stripping processes is that the chemistry can be specifically tailored to suite the most efficient degradation process without the need to change the chemistry of the entire stream of raw water or AFFF feedstock passing through the adsorption/stripping unit (first system). For example, suppose the photo-degradation process favors a low pH (e.g., pH=5). Sun et al., "Heterogeneous Photocatalytic Decomposition of Per- and Poly-fluoroalkyl Substances: A review," *Critical Reviews in Environmental Science and Technology* 50(5): 523-547 (2020), which is hereby incorporated by reference in its entirety. The flow rate of fluid (water) needed to convey the solids through the regenerator is orders of magnitude smaller than the flow rate of raw water or AFFF solution conveyed through the stripping unit, and they do not blend. Therefore, it is possible to change the pH of the water used to convey the photocatalytic adsorbent solids through the regenerator without altering the entire volumetric flow rate of water or AFFF feed stock solution which allows this water to be recycled without the need for a significant amount of pH adjusting chemical to be used.

Example 6—Photocatalytic Adsorbent

The photocatalytic adsorbent is an essential portion of this process. If the photocatalytic adsorbent material lacks affinity for the PFAS/target compound, photocatalytic adsorbent the removal of the PFAS/target compound will not occur and the treatment process will occur at a very low efficiency or not at all. This is the case even if the degradation kinetics are sufficiently rapid to decompose the PFAS/target compound in the regenerator. Therefore, the photocatalytic adsorbent must have an affinity for the PFAS/target compound(s) in order for the degradation to be possible. Beta (all-silica) zeolite is a promising adsorbent because it has a high affinity for hydrophobic materials such as PFAS (Van den Bergh et al., "Highly Selective Removal of Perfluorinated Contaminants by Adsorption on All-Silica Zeolite Beta," *Angewandte Chemie International Edition* 59(33):14086-14090 (2020), which is hereby incorporated by reference in its entirety) and has the ability to withstand strong oxidizers. However, the adsorbent is not enough to promote photooxidation. To address this, titanium dioxide or other photocatalysts can be composited with zeolites to build composites that can function in both capacities. Jan et al., "Titanium Dioxide/Zeolite Catalytic Adsorbent For the Removal of NO and Acetone Vapors," *Journal of the Air & Waste Management Association* 59(10):1186-93 (2009); Yamashita et al., "Efficient Adsorption and Photocatalytic Degradation of Organic Pollutants Diluted in Water Using the Fluoride-modified Hydrophobic Titanium Oxide Photocatalysts: Ti-containing beta Zeolite and $TiO_2$ loaded on HMS Mesoporous Silica," *Catalysis Today* 126(3):375-381 (2007); 2nd Japan-China Workshop on Environmental Catalysis and Eco-materials, Fukuoka, Japan (23-25 Oct. 2005); and Lafjah et al., "Beta Zeolite Supported sol gel $TiO_2$ Materials for Gas Phase Photocatalytic Applications," *Journal of Hazardous Materials* 186(2):1218-25 (2011), all of which are hereby incorporated by reference in their entirety.

Example 7—Process Example

Even though the kinetics and stripping processes are decoupled mechanistically, they are linked as each of the two processes determines the boundary conditions of the other. A process example including both inputs and outputs is shown below in Table 3 and the length of regenerator reactor is a function of regeneration kinetics is shown in Table 4. The equilibrium curve for beta zeolite was obtained from the work of Van den Burgh et al. Van den Bergh et al., "Highly Selective Removal of Perfluorinated Contaminants by Adsorption on All-Silica Zeolite Beta," *Angewandte Chemie International Edition* 59(33):14086-14090 (2020), which is hereby incorporated by reference in its entirety.

TABLE 3

Process Parameters for a AFFF Treatment Reactor.

| | |
|---|---|
| AFFF solution PFOA concentration | 3%, $X_{native}$ = 0.0309 kg PFOA/kg water |
| Dilute AFFF by a factor of 172 | $X_{in}$ = 1.8 × 10$^{-4}$ kg PFOA/kg water |
| Process output, 1% of feed concentration | $X_{out} = 1.8 \times 10^{-6} \text{ kg} \frac{\text{PFOA}}{\text{kg}} \text{water}$ |
| Adsorbent circulation rate to generator | $G_p$ = 0.021 kg/s |
| Concentration of PFOA on solids leaving the stripping unit | $X_{out}$ = 0.35 kg PFOA/kg adsorbent |
| Concentration of PFOA on solids leaving the stripping unit | $X_{in}$ = 0.01 kg PFOA/kg adsorbent |
| Stripping bed height | To be determined |
| Regenerator length | See Table 4 |

TABLE 4

Length of Regenerator Reactor is a Function of Regeneration Kinetics.

| $k'_p$ sec$^{-1}$ | $L'_r$ m | $\bar{t}$ s |
|---|---|---|
| 0.0100 | 168 | 593 |
| 0.0200 | 84.0 | 296 |
| 0.0500 | 34.0 | 120 |
| 0.100 | 17.0 | 60.0 |
| 0.200 | 8.40 | 29.6 |

Example 8—Method

There are several pieces of information that are needed to develop a demonstration system which can then be scaled to a pilot plant and eventually a full-scale water or AFFF treatment process. The necessary information includes, first, a liquid-solid equilibrium curve which provides a relationship between the concentration of the PFAS/target compound in the water to the amount adsorbed onto the of the adsorbent. This must be obtained from either the manufacturer of the adsorbent or measured in a laboratory. Secondly, the kinetics of the degradation process of the physisorbed PFAS/target compound needs to be measured. This measurement process must use photocatalyst/adsorbent that is laden with the PFAS/target compound with none in the water. This will replicate the conditions in the regenerator.

The particle characteristics that are needed for modeling and controlling the flow of the photocatalytic adsorbent in the stripping section and the regenerator including: $U_{mF}$, minimum fluidization velocity in water; $U_t$, single particle terminal velocity in water; pp, the particle density; and $d_p$, the particle diameter.

To model the reactor performance, the following parameters need to be defined: (1) $D_b$, moving bed diameter; (2) $D_r$, diameter of the regenerator reactor; (3) the characteristics of the ultraviolet illumination system used to provide energy for regenerating the photocatalytic adsorbent material. The wavelength $\lambda=254$ nm is a commonly used wavelength because it is commercially available; (4) the terminal settling velocity of the particles; and (5) the minimum fluidization velocity of the particles. The particle separator must be designed to allow the water used for transporting the solids to be separated so only the particles reenter the moving bed stripping unit.

Required Equipment—The equipment needed to demonstrate the process includes the analytical devices used for characterizing the photocatalyst/adsorbent and the process equipment itself. Table 5 lists both sets of equipment needed to demonstrate the process.

TABLE 5

Equipment Needed to Demonstrate the Process

| | |
|---|---|
| $d_p$, particle diameter | Microscopy of sieve analysis |
| $\rho_p$, particle density | Displacement method in water |
| Measurement of the decomposition kinetics | Collimated beam apparatus is needed for this process |
| $U_{mF}$ and $U_t$ | $U_{mF}$ requires a small fluidized bed which includes a flow meter for the water flow rate and a small pressure measuring device. $U_t$, the terminal velocity, requires a graduated cylinder and a stop watch or a photodetector and a data acquisition system |
| Glassware | Petri dishes, flasks, graduated cylinders, UV resistant eyewear |
| Supply of photocatalyst/adsorbent | Obtained from the vendor who manufactures the material |

Process equipment components

| Quantity | Item(s) |
|---|---|
| 1-4 | UV reactors with appropriate plumbing adapters |
| 2 | Stainless steel pumps, 1-2 hp each |
| 4 | 3 liquid tanks, stainless steel, 1 particle introduction vessel |
| 1 | Particle separator vessel with appropriate plumbing fittings |
| 1 | Particle conveying system for transporting particles from the bed to the inlet system to the riser |
| 2 | Valves for the valvelock system |
| 4 | 3 × water mass and 1 × multiphase mass flow meter, supplied by Emerson Micromotion |
| 1 | Integrated control and data acquisition system |
| 5 | Differential pressure sensors |
| 10 | Sanitary elbows |
| 1 | Dilution pump |
| 50 | Sanitary gaskets |
| 32 | Assorted Kee-Klamp fittings, elbows, tees, etc. |
| 3 | Tanks, in stainless steel for feed fluid, finished water and circulating water |
| 1 | Length of polymer hosing for filling the system |
| 1 | Control and data acquisition system equipment, wiring and electrical supplies, use of Lab View products |
| 1 | Length of riser pipe for process measurements upstream of the regenerator system Assorted wiring, conduits, and other equipment for electrical wiring, both power and signal/control |

Reagents—The following reagents are needed for making measurements of parameters for the process: PFOA or any other PFAS compound needed for running experiments (or AFFF stock solution); clean water; supply of photocatalyst/adsorbent materials; and organic solvents (e.g., citrusolve) for cleaning the equipment.

Protocol—The procedure for running the PFAS degradation equipment is captured in the following routing: (1) place the photocatalyst/adsorbent into the reactor to the level required to perform the stripping process plus an additional amount that is going to be held up in the regenerator and separator system; (2) turn on the pump that provides flow to the stripping unit to establish flow through the moving bed; (3) activate the valve lock system or the appropriate control system if one is used; (4) turn on the pump that provides flow to inlet of the riser which induces causes the particles to become entrained into the regenerator; (5) establish a continuous flow of solids through the system; and (6) begin to add the PFOA concentrate to allow it to enter the moving bed system. This is run until steady state is achieved. This is determined by testing influent and effluent samples for the moving bed to determine how long is required for the process to gain steady state operation. The water leaving the moving bed should not be discarded as it may contain enough PFOA to be out of compliance with water regulations (it should be either discarded lawfully or used as a feedstock for future PFOA degradation). Lastly, in (7), the data acquisition equipment can be engaged to ensure proper pressure, flow and other process parameters are maintained within the acceptable range of operating parameters.

Key Experiments—There are several key experiments that need to be run for determining the operating parameters of the process equipment and to demonstrate the efficacy of the process. These two classes of measurements are outlined below.

Preliminary Work—Preliminary work includes three steps. (1) measurement of degradation kinetics using a collimated beam apparatus which provides illumination of UV light onto a petri dish so the intensity is uniform across the entire dish surface area. The degradation kinetics information is needed to determine both the design (length) and operation (mean residence time of particles) of the regenerator, 2) measurement of adsorptive capacity and the equilibrium curve (isotherm) for the PFAS/target compound and the photocatalyst/adsorbent. This information is needed to determine the design and operation of the moving packed bed and to ensure there is sufficient inventory there to adsorb/remove the PFAS/target compound from the feed stream. This is the confirmation of the solids circulation rate for a given set of riser conditions including the dynamic pressure gradient and the water flow rate, 3) measurement of relevant physical and chemical parameters pertaining to the photocatalytic adsorbent.

The key experiments for the process are to run the equipment using the following operational parameters in Table 6 in accordance with the routing specified above.

TABLE 6

Operation of the Process Equipment.

| Operating parameter | Value |
| --- | --- |
| $G_p$, solids circulation rate | 0.0208 kg/s |
| $G_{f,r}$, Riser fluid mass flow rate | $4.8 \times 10^{-4}$ kg/s, $U_r = 0.3$ m/s |
| $G_{f,b}$, Bed fluid mass flow rate | 39.7 kg/s, $U_b = 0.0175$ m/s |

TABLE 6-continued

Operation of the Process Equipment.

| Operating parameter | Value |
| --- | --- |
| Dynamic pressure gradient in the riser | −900 Pa/m |
| Dilution ratio for the AFFF | 172:1 |

Example 9—Discussion

The rationale for this process is to isolate the PFAS/target compound from water or AFFF solution using a highly selective photocatalytic adsorbent in the front end of the process. This allows the water/carrier fluid to be discharged with the necessary amount of the PFAS/target compound removed from the water. Once the PFAS/target compound has been isolated and is sequestered onto the adsorbent, the solid particles are regenerated using a process tailored to regenerate the adsorbent. The regeneration process is designed to decompose the PFAS/target compound into minerals such as water, carbon dioxide, fluoride ($F^-$) ions, phosphate ($PO_4^{3-}$) and sulfate ($SO_4^{2-}$) ions. As stated earlier, the moving bed can be made deeper to improve its adsorptive capacity and the regenerator can be made longer to accommodate the degradation kinetics. These adaptive changes can be performed independently of each other which allows the extraction and degradation processes to be decoupled from each other even though one process provides boundary conditions for the other.

Decoupling is further extended beyond the stripping and regenerative processes to the control of the process from a fluid-mechanical perspective. The Type 2 DTSFB and the PRCR systems have been designed to allow the dynamic pressure drops across the moving packed bed (first system) and the riser regenerator (second system) to be independently specified and controlled. Likewise, with the proper configuration of the control valves, the flow rates through the moving packed bed (first system) and the riser (second system) can be independently specified and controlled. The independent control of the fluid flow rate through and dynamic pressure drop across the riser (second system) provides a means for independently specifying any two of the three riser parameters: (1) solids mass flow rate ($G_p$), (2) the solids fraction, and (3) the particle phase velocity. The control of the solids fraction in the riser allows the light intensity on the surface of the photocatalytic adsorbent to be optimized, and the control of the particle phase velocity allows the particle residence time in the riser to be adapted to both the decomposition kinetics and the length of the riser regenerator.

Degradation Method for PFAS—The PFAS processing system has been designed to treat AFFF concentrate as well as water that contains low concentrations of PFAS materials. The regenerator has been designed to expose the PFAS-laden adsorbent to conditions where the PFAS molecules are decomposed through several different potential pathways. The three methods of destroying PFAS: (1) photooxidation, (2) photoreduction, and (3) photolysis. These three methods can be used simultaneously to provide an additive method of regenerating the adsorbent material.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A fluid treatment apparatus comprising:
a first system for removing one or more target compounds from a fluid, said first system comprising adsorbent particles;
a second system for regenerating said adsorbent particles, said second system comprising:
a first riser inlet positioned to accept said adsorbent particles in a fluid,
a riser comprising a conduit to transport said adsorbent particles in said fluid, and
a first riser outlet configured to convey said adsorbent particles in said fluid to exit said second system;
a first connector between said first system and said second system, said first connector configured to transfer said adsorbent particles from said first system to said second system;
a second connector between said first system and said second system, said second connector configured to release said adsorbent particles from said second system, wherein said first system and said second system are decoupled such that the first system and the second system are positioned in entirely different locations relative to each other; and
an energy delivery system configured to expose said adsorbent particles to radiation.

2. The apparatus of claim 1, wherein said first system further comprises:
a vessel comprising adsorbent particles.

3. The apparatus of claim 1, wherein said first system further comprises:
a first fluid inlet positioned to accept fluid into said first system; and
a first fluid outlet positioned for treated fluid to exit said first system.

4. The apparatus of claim 1, wherein said first system further comprises:
a first adsorbent outlet positioned for adsorbent particles to exit said first system; and
a first adsorbent inlet positioned for adsorbent particles to enter said first system.

5. The apparatus of claim 1, wherein said radiation is electromagnetic radiation or ultrasonic radiation.

6. The apparatus of claim 1, wherein said energy delivery system is configured to regenerate adsorbent particles.

7. The apparatus of claim 1, wherein said energy delivery system is configured to decompose said one or more target compounds.

8. The apparatus of claim 1, wherein said energy delivery system produces a wavelength between about 10 nm and about 700 nm.

9. The apparatus of claim 1, wherein said first system is a stripping system.

10. The apparatus of claim 1, wherein said second connector is further configured to separate one or more regenerated adsorbent particles.

11. The apparatus of claim 1, wherein said second connector is further configured to isolate pressure in said second connector from pressure in said first system.

12. The apparatus of claim 1, wherein said one or more target compounds comprise at least one per- or polyfluoroalkyl substances (PFAS) selected from the group consisting of perfluorooctane sulfonate (PFOS) and perfluorooctanoic acid (PFOA), 1,4-dioxane, organic compounds, pesticides, herbicides, natural organic matter (NOM), disinfection byproducts, disinfection byproduct precursors (DBP), personal care products, pharmaceuticals, plasticisers, bispenol-A (BPA), endocrine disrupting chemicals, inorganic metals, or any combination thereof.

13. The apparatus of claim 1, wherein said adsorbent particles comprise at least one of zeolites, clays, cyclodextrins, activated silica, activated alumina, ion exchange resins, activated carbon, reactivated carbon, affinity beads, silica gel, molecular sieves, polymeric materials, photocatalysts, engineered particles, metal oxides, semiconductors, or any combination thereof.

14. The apparatus of claim 1, wherein said second system further comprises one or more photocatalysts, semiconductors, catalysts, adsorbents, metal oxides, or any combination thereof.

15. The apparatus of claim 1, wherein one or more conditions of said first system are adapted for adjustment independently of said second system.

16. The apparatus of claim 1, wherein one or more conditions of said second system are adapted for adjustment independently of said first system.

17. The apparatus of claim 1 further comprising:
one or more of said first system.

18. The apparatus of claim 1 further comprising:
one or more of said second system.

19. The apparatus of claim 1 further comprising:
a process control system.

20. A method for treating fluid, said method comprising:
providing fluid comprising one or more target compounds;
removing said one or more target compounds from said fluid in a first system comprising adsorbent particles;
regenerating said adsorbent particles in a second system, wherein said regenerating in said second system further comprises:
accepting adsorbent particles via a first riser inlet;
transporting adsorbent particles via a riser comprising a conduit to transport said adsorbent particles; and
transferring adsorbent particles through a first riser outlet to exit said second system;
providing a first connector between said first system and said second system, said connector configured to transfer said adsorbent particles from said first system to said second system;
providing a second connector between said first system and said second system, said second connector configured to release said adsorbent particles from said second system, wherein said first system and said second system are decoupled such that the first system and the second system are positioned in entirely different locations relative to each other, under conditions effective to treat said fluid; and
exposing said adsorbent particles to radiation via an energy delivery system.

21. The method of claim 20, said first system further comprising:
providing a vessel comprising adsorbent particles.

22. The method of claim 20, said first system further comprising:
providing said fluid comprising one or more target compounds into said first treatment system via a first fluid inlet; and providing a first fluid outlet positioned for treated fluid to exit said first system.

23. The method of claim 20, said first system further comprising:
    providing a first adsorbent outlet positioned for adsorbent particles to exit said first system; and
    providing a first adsorbent inlet positioned for adsorbent particles to enter said first system.

24. The method of claim 20, wherein said radiation is electromagnetic radiation or ultrasonic radiation.

25. The method of claim 20, wherein said energy delivery system is configured to regenerate adsorbent particles.

26. The method of claim 20, wherein energy delivery system is configured to decompose said one or more target compounds.

27. The method of claim 20, wherein said energy delivery system produces a wavelength between about 10 nm and about 700 nm.

28. The method of claim 20, wherein said first system is a stripping system.

29. The method of claim 20, wherein said one or more target compounds comprise at least one per- or polyfluoroalkyl substances (PFAS) selected from the group consisting of perfluorooctane sulfonate (PFOS) and perfluorooctanoic acid (PFOA), 1,4-dioxane, organic compounds, pesticides, herbicides, natural organic matter (NOM), disinfection byproducts, disinfection byproduct precursors (DBP), personal care products, pharmaceuticals, plasticisers, bispenol-A, endocrine disrupting chemicals, inorganic metals, or any combination thereof.

* * * * *